(12) United States Patent
Sminchisescu et al.

(10) Patent No.: US 11,069,150 B2
(45) Date of Patent: Jul. 20, 2021

(54) IMAGE PROCESSING METHOD, SYSTEM AND DEVICE FOR SYNTHESIZING HUMAN APPEARANCE

(71) Applicants: Cristian Sminchisescu, Bucharest (RO); Mihai Zanfir, Bucharest (RO); Alin-Ionut Popa, Sat Negoiesti (RO); Andrei Zanfir, Bucharest (RO); Elisabeta Marinoiu, Ploiesti (RO)

(72) Inventors: Cristian Sminchisescu, Bucharest (RO); Mihai Zanfir, Bucharest (RO); Alin-Ionut Popa, Sat Negoiesti (RO); Andrei Zanfir, Bucharest (RO); Elisabeta Marinoiu, Ploiesti (RO)

( * ) Notice: Subject to any disclaimer, the term of this patent is extended or adjusted under 35 U.S.C. 154(b) by 0 days.

(21) Appl. No.: 16/432,406

(22) Filed: Jun. 5, 2019

(65) Prior Publication Data

US 2019/0371080 A1    Dec. 5, 2019

(30) Foreign Application Priority Data

Jun. 5, 2018  (EP) .................................... 18176132

(51) Int. Cl.
| | |
|---|---|
| *G06T 19/20* | (2011.01) |
| *G06T 7/11* | (2017.01) |
| *G06K 9/00* | (2006.01) |
| *G06K 9/62* | (2006.01) |
| *G06T 17/20* | (2006.01) |
| *G06T 19/00* | (2011.01) |
| *G06T 13/40* | (2011.01) |

(52) U.S. Cl.
CPC .......... *G06T 19/20* (2013.01); *G06K 9/00362* (2013.01); *G06K 9/6256* (2013.01); *G06T 7/11* (2017.01); *G06T 17/20* (2013.01); *G06T 2207/20081* (2013.01); *G06T 2207/20084* (2013.01); *G06T 2207/30196* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 6,690,369 B1 * | 2/2004 | Smith, Jr. ............... | G06T 15/10 345/419 |
| 2009/0116766 A1 * | 5/2009 | Matsumoto ............. | G06T 7/194 382/311 |
| 2010/0045670 A1 * | 2/2010 | O'Brien .................. | G06T 15/04 345/420 |

(Continued)

*Primary Examiner* — Michael J Cobb
(74) *Attorney, Agent, or Firm* — Sprinkle IP Law Group

(57) ABSTRACT

The present invention is directed to generating an image based on first image data of a first person having first pose, first body shape, and first clothing and second image data of a second person having second pose, a second body shape, and second clothing. The generated image represents a transfer of appearance (e.g., clothing) of the second person to the first person. This is achieved by modeling 3d human pose and body shape for each of the persons via triangle mesh, fitting the 3d human pose and body shape models to the images of the persons, transferring appearance using barycentric methods for commonly visible vertices, and learning to color the remaining ones using deep image synthesis techniques.

20 Claims, 24 Drawing Sheets
(21 of 24 Drawing Sheet(s) Filed in Color)

(56) References Cited

U.S. PATENT DOCUMENTS

2015/0042651 A1* 2/2015 Dwyer ................... G06T 15/06
                                                    345/426
2017/0140512 A1* 5/2017 Hemani ................. G06T 19/20
2018/0068178 A1* 3/2018 Theobalt ............ G06K 9/00315

* cited by examiner

IMAGE PROCESSING METHOD, SYSTEM AND DEVICE FOR SYNTHESIZING HUMAN APPEARANCE

CROSS-REFERENCE TO RELATED APPLICATION(S)

This application claims a benefit of priority under 35 U.S.C. § 119 from European Patent Application Serial No. 18176132.1, filed on Jun. 5, 2018, entitled "IMAGE PROCESSING METHOD, SYSTEM AND DEVICE," which is fully incorporated by reference herein for all purposes.

TECHNICAL FIELD

The present invention is directed to image processing method, system and device. Particularly, the present invention is directed to generating an image in view of two already present images. Each one of the two already present images comprises image data of at least one person. An image is generated that synthesizes the pose of at least one person in one image and the clothing of at least one person in the other image.

BACKGROUND

People are of central interest in images and video, so understanding and capturing their pose and appearance from visual data is critically important. While problems like detection or 2d pose estimation have received considerable attention and witnessed significant progress recently, appearance modeling has been less explored comparatively, especially for bodies and clothing, in contrast to faces. One setback is that people are extremely sensitive to invalid human appearance variations and immediately spot them. This is to a large extent true for faces, as people are sharply tuned to fine social signals expressed as subtle facial expressions, but also stands true for human body poses, shapes and clothing. This makes it difficult to capture and possibly re-synthesize human appearance in ways that pass the high bar of human perception. While the realistic 3d human shape and appearance generation, including clothing, has been a long standing goal in computer graphics, with impressive studio results that occasionally pass the Turing test, these usually require complex models with sophisticated layering, manual interaction, and many cameras, which makes them difficult to use at large scale. For this purpose, flexible methods that can be learned from data and can synthesize realistic human appearance are of obvious value. Arguably, even more important would be methods that can be controlled by image evidence in some way. For instance one may not just aim to generate plausible human shape and appearance in isolation—hard as this may be—but also condition on specific elements of pose and appearance in a given image in order to synthesize new ones based on it.

SUMMARY

Herein, we formulate a new problem called human appearance transfer. Given a single source and a single target image of a person, each with different appearance, possibly different body shape and pose, the goal is to transfer the appearance of the person in the first image into the one of the person of the target image while preserving the target clothing and body layout. The problem is challenging as people are in different poses and may have different body shapes. A purely image warping or image to image translation approach would not easily generalize due to the large number of degrees of freedom involved in the transformation, e.g. the effect of articulation, depth and body shape on appearance. We provide a first solution that relies on fitting state-of-the-art 3d human pose and body models to both the source and the target images, transferring appearance using barycentric methods for commonly visible vertices, and learning to color the remaining ones using deep image synthesis techniques with appropriately structured 2d and 3d inputs. Example images, perceptual user studies, Inception scores (see T. Salimans, I. Goodfellow, W. Zaremba. V. Cheung, A. Radford, X. Chen, and X. Chen: "Improved techniques for training gans", in NIPS. 2016, wherein disclosure of said publication is incorporated herein by reference), and the response of a state-of-the-art person detector confirm that the generated images of humans are perceptually plausible.

See hereto FIG. 1, which shows a bidirectional transfer automatically produced by our method. We transfer from one image (first column) to the second (second column) and vice-versa, with automatically generated images shown on the third and fourth columns.

We propose an automatic person-to-person appearance transfer model based on explicit parametric 3D human representations and learned, constrained deep translation network architectures for photographic image synthesis. Given a single source image and a single target image, each corresponding to different human subjects, wearing different clothing and in different poses, our goal is to photorealistically transfer the appearance from the source image onto the target image while preserving the target shape and clothing segmentation layout. Our solution to this new problem is formulated in terms of a computational pipeline that combines (1) 3D human pose and body shape estimation from monocular images, (2) identifying 3d surface colors elements (mesh triangles) visible in both images, that can be transferred directly using barycentric procedures, and (3) predicting surface appearance missing in the first image but visible in the second one using deep learning-based image synthesis techniques. Our model achieves promising results as supported by a perceptual user study where the participants rated around 65% of our results as good, very good or perfect, as well in automated tests (Inception scores and a Faster-RCNN human detector responding very similarly to real and model generated images). We further show how the proposed architecture can be profiled to automatically generate images of a person dressed with different clothing transferred from a person in another image, opening paths for applications in entertainment and photo-editing (e.g. embodying and posing as friends or famous actors), the fashion industry, or affordable online shopping of clothing.

The objects of the present application are solved by subject matters of independent claims. Further exemplary embodiments are provided in independent claims.

According to an aspect of the present invention a method is provided that comprises: determining in a first image a person and a first 3D human pose and body shape fitting model, wherein the person has a first pose and a first clothing; determining in a second image a person and a second 3D human pose and body shape fitting model, wherein the person has a second pose and a second clothing; and generating, by use of the first 3D human pose and body shape fitting model and by use of the second 3D human pose and body shape fitting model, an image comprising the person of the first image in the first pose and with the second clothing and/or generating, by use of the first 3D human pose and body shape fitting model and by use of the second 3D human pose and body shape fitting model, an image comprising the person of the second image in the second pose and with the first clothing.

According to an embodiment, the first 3D human pose and body shape fitting model comprises a first number of vertices and a first set of faces that form a first triangle mesh, and the second 3D human pose and body shape fitting model comprises a second number of vertices and a second set of faces that form a second triangle mesh.

According to an embodiment, the generating of the image comprises: determining a common set of visible vertices visible in the first triangle mesh with regard to the person in the first image and in the second triangle mesh with regard to the person in the second image: determining a divergent set of vertices visible in the first triangle mesh with regard to the person in the first image and not visible in the second triangle mesh with regard to the person in the second image; assigning colors to the vertices in the common set of visible vertices by using a barycentric transfer: training a first neural network for body color completion for assigning colors to vertices of the first triangle mesh that are visible and that are not present in the common set of visible vertices; and training a second neural network for human appearance synthesis for assigning colors of resulting appearance image of the first person, that are part of clothing, but cannot be modeled by the mesh model of the first person and the first neural network for body color completion.

According to an aspect of the present invention, a method is provided for generating an image based on first image data of a first person having a first pose, a first body shape, and a first clothing and second image data of a second person having a second pose, a second body shape, and a second clothing, wherein the generated image is an image of the first person, wherein: the first image data comprises a first 3D human pose and body shape fitting model, which comprises a first number of vertices and a first set of faces that form a first triangle mesh, which represents estimates of the first pose and of the first shape of the first person: and the second image data comprises a second 3D human pose and body shape fitting model, which comprises a second number of vertices and a second set of faces that form a second triangle mesh, which represents estimates of the second pose and of the second shape of the second person: and wherein the method comprises: determining a common set of visible vertices comprising vertices that are visible in the first triangle mesh with regard to the first person and in the second triangle mesh with regard to the second person: determining a divergent set of vertices visible in the first triangle mesh with regard to the first person and not visible in the second triangle mesh with regard to the second person; assigning colors to the vertices in the common set of visible vertices by using a barycentric transfer; completing assignment of body to color in the first triangle mesh by using a first neural network module trained for body color completion by assigning colors to vertices of the first triangle mesh that are visible and that are not present in the common set of visible vertices; and completing appearance of the first person in the image by using a second neural network module trained for human appearance synthesis by assigning colors of resulting appearance image of the first person, that are part of the second clothing, but cannot be modeled by the first mesh model of the first person and the first neural network for body color completion.

According to an aspect of the present invention, a method is provided for generating an image based on first image data of a first person having a first pose, a first body shape, and a first clothing and second image data of a second person having a second pose, a second body shape, and a second clothing, wherein the generated image is an image of the first person, wherein: the first image data comprises a first 3D human pose and body shape fitting model, which comprises a first number of vertices and a first set of faces that form a first triangle mesh, which represents estimates of the first pose and of the first shape of the first person: and the second image data comprises a second 3D human pose and body shape fitting model, which comprises a second number of vertices and a second set of faces that form a second triangle mesh, which represents estimates of the second pose and of the second shape of the second person; and wherein the method comprises: determining a common set of visible vertices comprising vertices that are visible in the first triangle mesh with regard to the first person and in the second triangle mesh with regard to the second person: determining a divergent set of vertices visible in the first triangle mesh with regard to the first person and not visible in the second triangle mesh with regard to the second person; assigning colors to the vertices in the common set of visible vertices by using a barycentric transfer; training a first neural network module for body color completion for assigning colors to vertices of the first triangle mesh that are visible and that are not present in the common set of visible vertices; and training a second neural network module for human appearance synthesis for assigning colors of resulting appearance image of the first person, that are part of the second clothing, but cannot be modeled by the first mesh model of the first person and the first neural network for body color completion.

According to an embodiment, the assigned colors of resulting appearance image of the first person, which are part of the second clothing, are outside coverage of the first mesh model of the first person.

According to an embodiment, the first person is different from the second person or the first person and the second person are the same person.

According to an embodiment, the first 3D human pose and body shape fitting model represents a tuple $St=(Ct, Dt, Mt)$, wherein, with regard to the first triangle mesh, $Ct$ encodes a RGB color at each vertex position, $Dt$ encodes a disparity 3d depth map of the first triangle mesh with respect to the first image data of the first person, and $Mt$ encodes a visibility of each vertex. According to an embodiment, the second 3D human pose and body shape fitting model represents a tuple $Ss=(Cs, Ds, Ms)$, wherein, with regard to the second triangle mesh, $Cs$ encodes a RGB color at each vertex position. $Ds$ encodes a disparity map of the second triangle mesh with respect to the second image data of the second person, and $Ms$ encodes a visibility of each vertex.

According to an embodiment, the first 3D human pose and body shape fitting model is determined or obtained by determining, with regard to the first person (in the first image) and by using a multitask deep neural network model corresponding 2D body joint locations, semantic body part segments and 3D pose and by refining the first 3D human pose and body shape fitting model by executing non-linear optimization. According to an embodiment, the second 3D human pose and body shape fitting module is determined or obtained by determining, with regard to the second person (in the second image) and by using the multitask deep neural network model, corresponding 2D body joint locations, semantic body part segments and 3D pose and by refining the second 3D human pose and body shape fitting model by executing non-linear optimization.

According to an embodiment, the refining the first 3D human pose and body shape fitting model by executing non-linear optimization comprises aligning, with regard to the first person (in the first image), a corresponding articulated human body mesh with a semantic segmentation layout obtained by using the multitask deep neural network model with regard to the first person (in the first image). According to an embodiment, the refining the second 3D human pose and body shape fitting model by executing non-linear optimization comprises aligning, with regard to the second person (in the second image), a corresponding articulated human body mesh with a semantic segmentation layout obtained by using the multitask deep neural network model with regard to the second person (in the second image).

According to an embodiment, the non-linear optimization is performed by executing semantic fitting where vertices of the respective mesh model (i.e. the first or second mesh model) carry a body type which is matched to the corresponding body type pixels detected in the respective image data (i.e., the first or second image or the first or second image data respectively) in the sense that vertices of a particular type of 3d model should be onto pixels detected of the same type in the image.

According to an embodiment, the training of the first neural network comprises using weakly-supervised learning based on sampling subsets of visible vertices of a 3d mesh fitted to images of people, as source and target set for self-training, respectively.

According to an embodiment, the first neural network and the second neural network are first and second neural network modules, respectively. According to an embodiment, the parameters of all neural network modules, i.e. for example of the first and the second module, are trained in an end-to-end process and using a multi-task loss. According to an embodiment, the neural network modules are part of a larger integrated system that is trained in a consistent manner.

According to an embodiment, the second neural network for human appearance synthesis is trained to predict its final output, given among inputs, clothing segmentation layout, disparity map and results predicted by the first neural network for body color completion.

According to an embodiment, the generating of the image comprises transferring a clothing layout of the second image data to a clothing layout of the first image data.

According to an aspect of the present invention, a device is provided that configured to execute steps of a method as outlined above and as described in more detail below. The device comprises according to an embodiment one or more processing means (e.g., processors) that are configured to correspondingly execute said steps.

According to an aspect of the present invention, a system is provided that configured to execute steps of a method as outlined above and as described in more detail below. According to an embodiment, the system comprises one or more components or modules respectively that are configured to correspondingly execute said steps.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects, features, and advantages of the invention will become apparent and will be more readily appreciated from the following description of example embodiments, taken in conjunction with the accompanying drawings of which.

DETAILED DESCRIPTION

Figure 1:
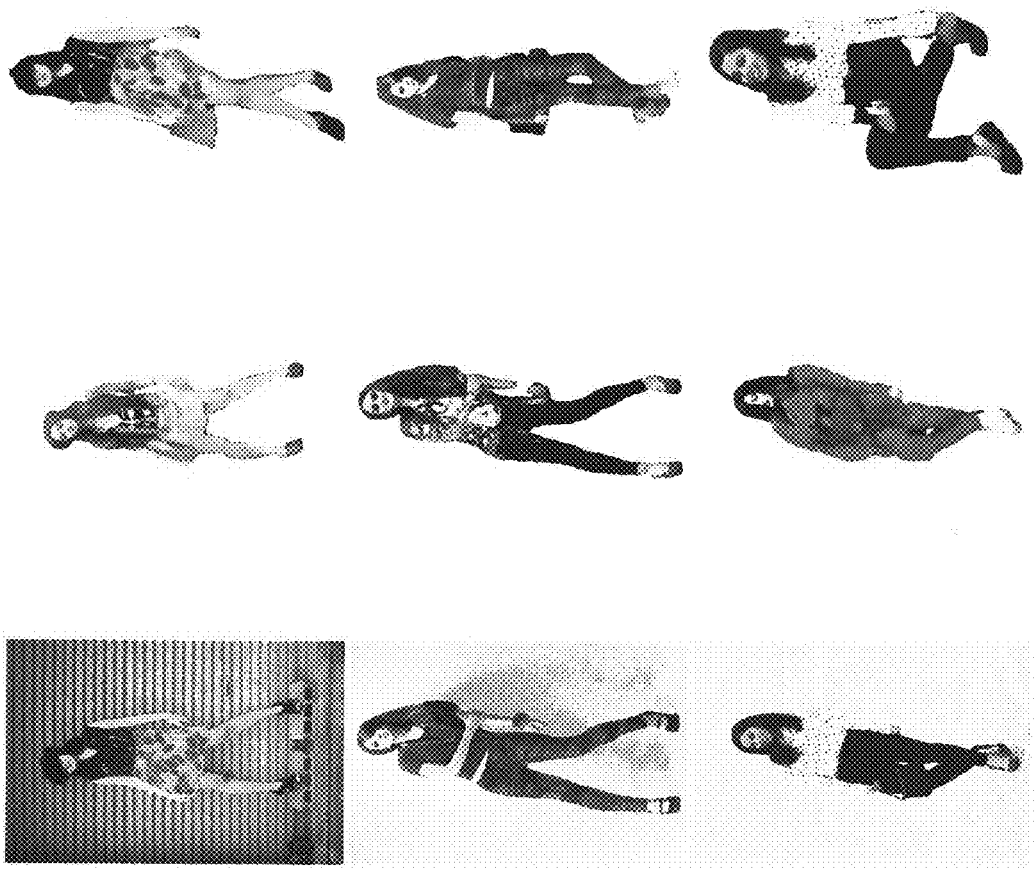
FIG. 1 shows a bidirectional transfer from one image (first column) to the second (second column) and vice-versa automatically produced according to an embodiment of the present invention.
Figure 1:
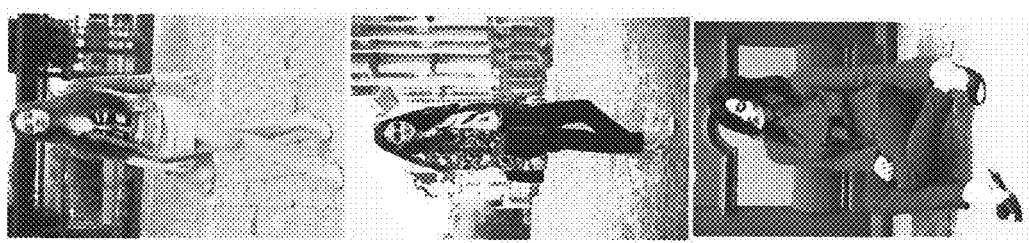

Hereinafter, some exemplary embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure. Generally, it has to be noted that all arrangements, devices, systems, modules, components, units, and means and so forth described herein could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Further, the method of the present invention and its various steps are embodied in the functionalities of the various described apparatus elements. Moreover, any of the embodiments and features of any of the embodiments, described herein, may be combined with each other, i.e. may supplement each other, unless a combination is explicitly excluded.

Figure 21:
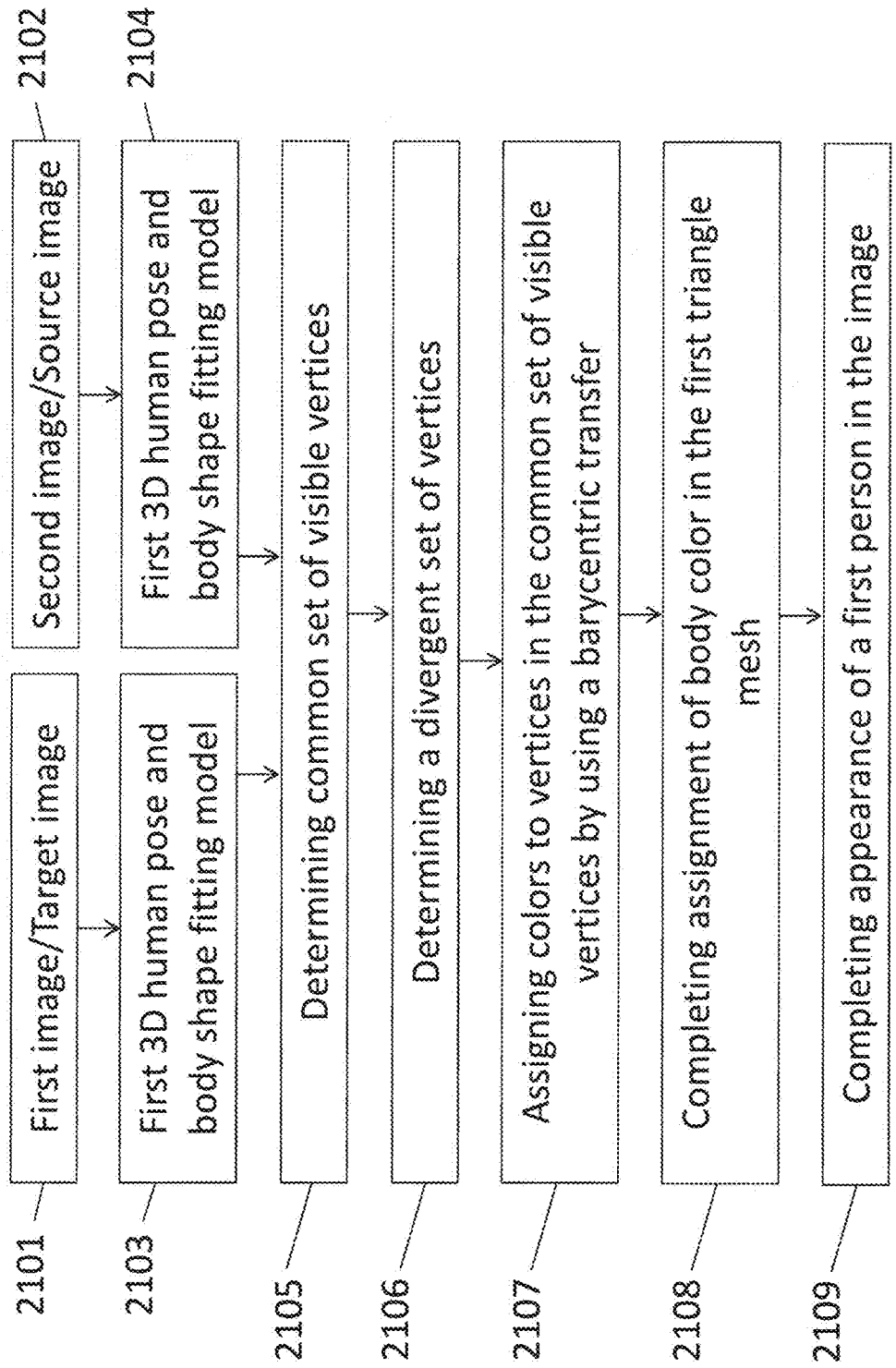
FIG. 21 generally visualizes aspects of the present invention according to an embodiment of the present invention.

The above-mentioned aspects of the invention, which are discussed in more detail in the following, are exemplary shown in FIG. 21. Particularly. FIG. 21 generally visualizes aspects of the present invention according to an embodiment of the present invention.

The first or target image 2101 comprises first image data of a first person having a first pose, a first body shape, and a first clothing. The second or source image 2102 comprises to second image data of a second person having a second pose, a second body shape, and a second clothing. According to the present embodiment, the transfer is done to first or target image 2101 from second or source image 2102. I.e., the clothes of the second person are transferred to the first person (see FIG. 2). The result of the transfer is a new generated image of the first person having the clothes of the second person.

From each one of the images, corresponding image data of the corresponding person are determined or obtained. Thus, from the first or target image 2101, first image data 2103 is obtained. The first image data 2103 comprises a first 3D human pose and body shape fitting model 2103, which in turn comprises a first number of vertices and a first set of faces that form a first triangle mesh, which represents estimates of the first pose and of the first shape of the first person (see in FIG. 3 the triangle mesh obtained from the image data of the person shown in the target image). Correspondingly, from the second or source image 2102, second image data 2104 is obtained. The second image data 2104 comprises a second 3D human pose and body shape fitting model 2104, which in turn comprises a second number of vertices and a second set of faces that form a second triangle mesh, which represents estimates of the first pose and of the first shape of the second person (see in FIG. 3 the triangle mesh obtained from the image data of the person shown in the source image).

For executing the transfer, i.e. for generating an image of the first person having clothes of the second person, a common set of visible vertices comprising vertices that are visible in the first triangle mesh with regard to the first person and in the second triangle mesh with regard to the second person is determined 2105 according to the present embodiment. Additionally, a divergent set of vertices comprising vertices visible in the first triangle mesh with regard to the first person and not visible in the second triangle mesh with regard to the second person is determined 2106.

After determining 2105 the common set of visible vertices, assigning 2107 colors to the vertices in the common set of visible vertices by using a barycentric transfer is done. Then, assignment of body color in the first triangle mesh is completed 2108 by using a first neural network module trained for body color completion by assigning colors to vertices of the first triangle mesh that are visible and that are not present in the common set of visible vertices. The image that is generated will comprise the first person as represented by the colored first triangle mesh (see FIG. 2).

However, because the first person also may/will have hair that extends beyond first person's body shape and/or because clothes cover also further area around first person's body shape, the first mesh model reflecting the first person's body shape, i.e. person's body, will not cover every detail of the first person's image data to be generated (e.g. hair and/or clothes that extend beyond the first person's body shape). Thus, first person's image data parts are present that cannot be modeled by the first mesh model and the first neural network for body color completion. Therefore, completing appearance of the first person in the image that is generated is executed 2109 by using a second neural network module trained for human appearance synthesis by assigning colors of resulting appearance image of the first person, that are part of the second clothing, but cannot be modeled by the first mesh model of the first person and the first neural network for body color completion. After the completing of the appearance of the first person in the image, the generated image will comprise image data of the first person comprising the colored first triangle mesh and the assigned colors (see FIG. 2).

Figure 22:
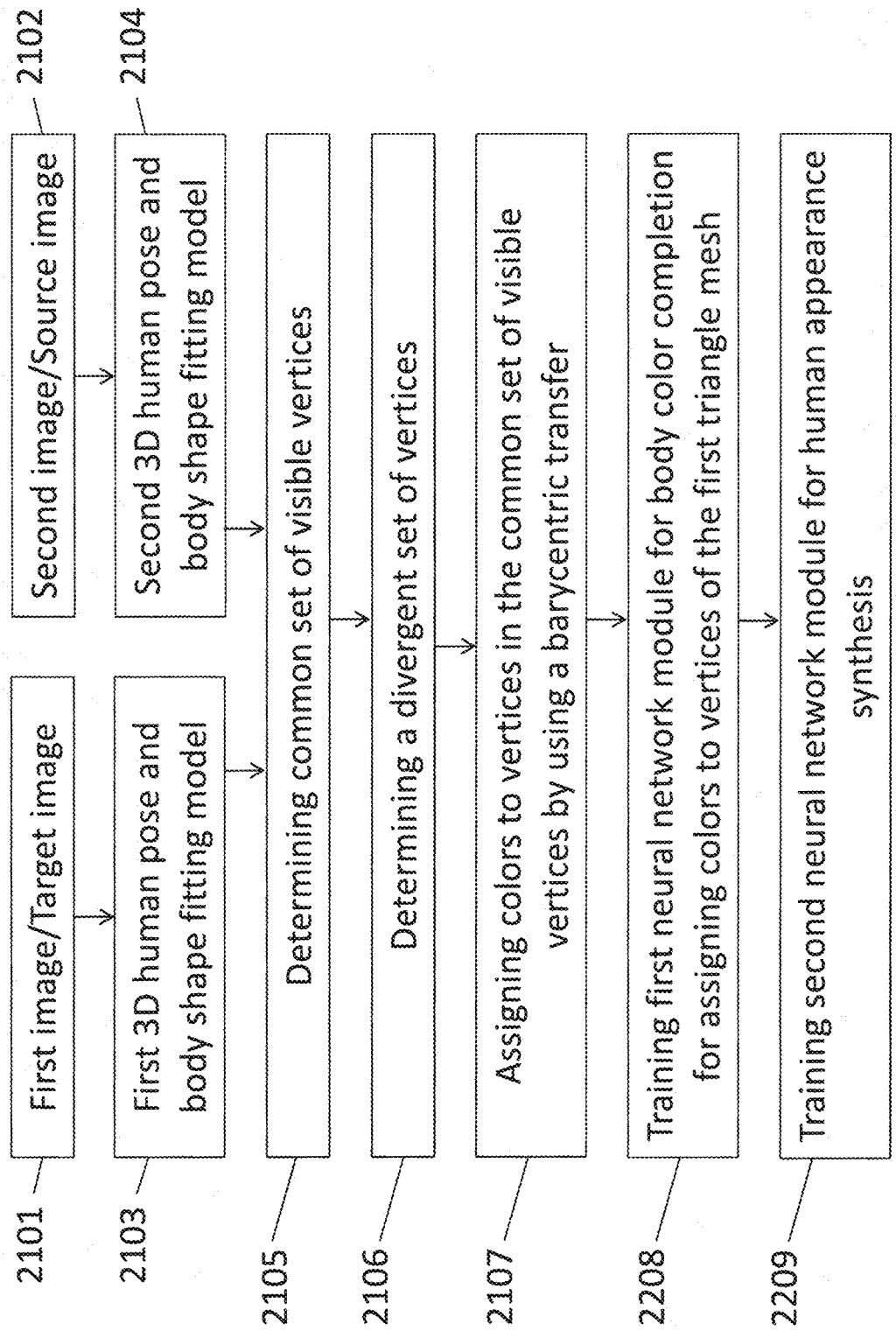
FIG. 22 generally visualizes aspects of the present invention according to an embodiment of the present invention.

The above-described embodiment refers to generating an image of the first person having clothes of the second person directly. However, the first and second network modules are to be trained for using them according to FIG. 21. The training of the first and second network modules is reflected in FIG. 22. FIG. 22 differs from FIG. 21 in that the first and second neural networks are correspondingly trained; see reference numbers 2208 and 2209 in FIG. 22.

Thus the steps/modules/data 2101 to 2107 in FIG. 22 correspond to the respective steps/modules/data 2101 to 2107 of FIG. 21. Subsequently, however, training 2208 the first neural network module for body color completion for assigning colors to vertices of the first triangle mesh that are visible and that are not present in the common set of visible vertices, and training 2209 the second neural network module for human appearance synthesis for assigning colors of resulting appearance image of the first person, that are part of the second clothing, but cannot be modeled by the first mesh model of the first person and the first neural network for body color completion are executed. The trained first and second neural networks can then be used in the embodiment of FIG. 21, particularly in steps/modules 2108 and 2109 of FIG. 21.

Our work relies on 2d human detection and body part labeling (see F. Bogo, A. Kanazawa, C. Lassner, P. Gehler, J. Romero, and M. J. Black: "Keep it smpl: Automatic estimation of 3d human pose and shape from a single image", in ECCV, 2016: A. Popa, M. Zanfir, and C. Sminchisescu: "Deep Multitask Architecture for Integrated 2D and 3D Human Sensing", in CVPR. July 2017: and K. He, G. Gkioxari. P. Doll'ar, and R. Girshick: "Mask r-cnn", in ICCV, 2017: wherein the disclosures of said documents are included herein by reference), 3d pose estimation (see A. Popa. M. Zanfir, and C. Sminchisescu: "Deep Multitask Architecture for Integrated 2D and 3D Human Sensing", in CVPR. July 2017; F. Bogo, A. Kanazawa, C. Lassner, P. Gehler. J. Romero. and M. J. Black: "Keep it smpl: Automatic estimation of 3d human pose and shape from a single image", in ECCV, 2016; A. Toshev and C. Szegedy. Deeppose: "Human pose estimation via deep neural networks", in CVPR, 2014: wherein the disclosures of said documents are included herein by reference), parametric 3d human shape modeling (see R. Goldenthal, D. Harmon, R. Fattal, M. Bercovier, and E. Grinspun: "Efficient simulation of inextensible cloth", ACM Transactions on Graphics (TOG), 26(3):49, 2007; F. Xu, Y. Liu, C. Stoll, J. Tompkin. G. Bharaj, Q. Dai, H.-P. Seidel, J. Kautz, and C. Theobalt: "Video-based characters: Creating new human performances from a multi-view video database", in ACM SIGGRAPH 2011 Papers, SIGGRAPH, pages 32:1-32:10, New York, N.Y., USA, 2011, ACM; R. Narain, A. Samii, and J. F. O'Brien: "Adaptive anisotropic remeshing for cloth simulation", ACM transactions on graphics (TOG), 31(6):152, 2012; M. Loper, N. Mahmood, J. Romero, G. Pons-Moll, and M. J. Black. Smpl: A skinned multi-person linear model, SIGGRAPH, 34(6):248, 2015; wherein the disclosures of said documents are included herein by reference) procedures devoted to the semantic segmentation of clothing (see E. Simo-Serra. S. Fidler, F. Moreno-Noguer, and R. Urtasun: "A high performance crf model for clothes parsing", in ACCV, 2014; K. Gong, X. Liang, X. Shen, and L. Lin "Look into person: Self-supervised structure-sensitive learning and a new benchmark for human parsing", in CVPR, July 2017; Z. Liu, P. Luo, S. Qiu, X. Wang. and X. Tang: "Deepfashion: Powering robust clothes recognition and retrieval with rich annotations" in CVPR, pages 1096-1104, 2016; M. Hadi Kiapour, X. Han, S. Lazebnik, A. C. Berg, and T. L. Berg: "Where to buy it: Matching street clothing photos in online shops"; in ICCV, December 2015; wherein the disclosures of said documents are included herein by reference), as well as image translation and synthesis methods (see P. Isola, J.-Y Zhu, T. Zhou, and A. A. Efros: "Image-to-image translation with conditional adversarial networks", in CVPR, 2017; Q. Chen and V. Koltun: "Photographic image synthesis with cascaded refinement networks", in ICCV, October 2017; A. Nguyen. J. Yosinski, Y. Bengio, A. Dosovitskiy, and J. Clune: "Plug & play generative networks: Conditional iterative generation of images in latent space", in CVPR. 2017: C. Ledig, L. Theis, F. Husz'ar, J. Caballero, A. Cunningham, A. Acosta, A. Aitken, A. Tejani, J. Totz, Z. Wang, et al.: "Photo-realistic single image super-resolution using a generative adversarial network", in CVPR, 2017; J.-Y. Zhu, T. Park, P. Isola, and A. A. Efros: "Unpaired imageto-image translation using cycle-consistent adversarial networks", in ICCV, 2017; Q. Chen and V. Koltun: "Photographic image synthesis with cascaded refinement networks", in ICCV, October 2017; C. Yang, X. Lu, Z. Lin, E. Shechtman, O. Wang, and H. Li: "High-resolution image inpainting using multi-scale neural patch synthesis", in CVPR, 2017; wherein the disclosures of said documents are included herein by reference).

Modeling the human appearance is a vast topic that has been approached on several fronts. One is through modifications of real images (see C. Ionescu, D. Papava, V. Olaru, and C. Sminchisescu: "Human3.6M: Large Scale Datasets and Predictive Methods for 3D Human Sensing in Natural Environments", PAMI. 2014; L. Pishchulin, A. Jain, M. Andriluka, T. Thormaehlen, and B. Schiele: "Articulated people detection and pose estimation: Reshaping the future", in CVPR. June 2012; wherein the disclosures of said documents are included herein by reference), although the results are not entirely realistic. Computer graphics pipelines are also used, either in a mixed reality setting—where a moderately realistic graphics model is rendered in a real scene in a geometrically correct manner (see C. Ionescu. D. Papava, V. Olaru, and C. Sminchisescu: "Human3.6M: Large Scale Datasets and Predictive Methods for 3D Human Sensing in Natural Environments", PAMI, 2014; wherein the disclosures of said document is included herein by reference)—or e.g. by fitting a SCAPE model to real images (see W Chen, H. Wang, Y. Li, H. Su, Z. Wang, C. Tu, D. Lischinski, D. Cohen-Or, and B. Chen: "Synthesizing training images for boosting human 3d pose estimation", in 3D Vision (3DV), 2016 Fourth International Conference on, pages 479-488, IEEE, 2016; wherein the disclosures of said document is included herein by reference). In the former, the graphics character is still not photo-realistic; in the latter, clothing geometry is lacking. Detailed, accurate human shape estimation from clothed 3d scan sequences (see C. Zhang, S. Pujades, M. Black, and G. Pons-Moll: "Detailed, accurate, human shape estimation from clothed 3d scan sequences", in CVPR, 2017; wherein the disclosures of said document is included herein by reference) can produce very good results but the acquisition setup is considerably more involved. Models to realistically capture complex human appearance including clothing in a laboratory setup, based on multiple cameras and relatively simple backgrounds appear in V. Leroy, J.-S. Franco, and E. Boyer: "Multi-view dynamic shape refinement using local temporal integration", in ICCV, 2017, wherein the disclosures of said document is included herein by reference. Procedures directed to the realistic acquisition of clothing exist (see G. Pons-Moll, S. Pujades, S. Hu, and M. Black. ClothCap: "Seamless 4D clothing capture and retargeting. ACM Transactions on Graphics. (Proc. SIGGRAPH), 36(4), 2017, two first authors contributed equally: C. Zhang, S. Pujades, M. Black, and G. Pons-Moll: "Detailed, accurate, human shape estimation from clothed 3d scan sequences", in CVPR, 2017; wherein the disclosures of said documents are included herein by reference), but rely on an existing set of 3d models of garments and a 3d scanning device.

The methodology reviewed in the previous paragraph achieves excellent results under the application constraints it was designed for. However, some requires manual interaction, multiple cameras, simple backgrounds, specialized scanners, or complex modeling setups. In contrast, we aim at automatic appearance modeling in situations where one has no control on the acquisition setup and is given a minimal number of images (one or two). The idea is to exploit precise, but inherently limited in coverage, geometric estimation methods for the human pose and shape, and complement them with learning techniques, in order to achieve photo-realistic appearance transfer for specific images. There is relatively little research focusing on human appearance generation based on a combination of geometric and learning methods. One notable exception is the recent work by C. Lassner, G. Pons-Moll, and P. V. Gehler: "A generative model of people in clothing", in ICCV. 2017 (wherein the disclosure of said document is included herein by reference) which is able to generate realistic images of people given their silhouette, pose and clothing segmentation. The method relies on a variational auto-encoder (see T. D. Kulkarni, W. Whitney, P. Kohli, and J. B. Tenenbaum: "Deep convolutional inverse graphics network", in NIPS, 2015; wherein the disclosure of said document is included herein by reference) and a GAN (see I. Goodfellow. J. Pouget-Abadie, M. Mirza, B. Xu, D.Warde-Farley, S. Ozair, A. Courville, and Y. Bengio: "Generative adversarial nets", in NIPS, 2014: P. Isola, J.-Y. Zhu, T. Zhou, and A. A. Efros: "Image-to-image translation with conditional adversarial networks", in CVPR, 2017: wherein disclosures of said documents are included herein by reference) for realistic image generation. However, it is not obvious how this model would perform inference for the appearance given an image, or how can it condition on a particular appearance and photo-realistically transfer it to a new pose. The human appearance transfer between two monocular images falls out of the domain of applicability of models like C. Lassner, G. Pons-Moll, and P. V. Gehler: "A generative model of people in clothing", in ICCV, 2017 (wherein the disclosure of said document is included herein by reference), and is the new problem defined and confronted in this research.

Human Appearance Transfer

Given a pair of RGB images—source and target, denoted by $I_s$ and $I_t$, each containing a person—, the main objective of our work is to transfer the appearance of the person from $I_s$ into the body configuration of the person from $I_t$, resulting in a new image $I_{s \rightarrow t}$ (the procedure is symmetric, as we can transfer in both directions.). Our proposed pipeline is shown in FIG. 2 and details are given in the next sections.

Figure 2:
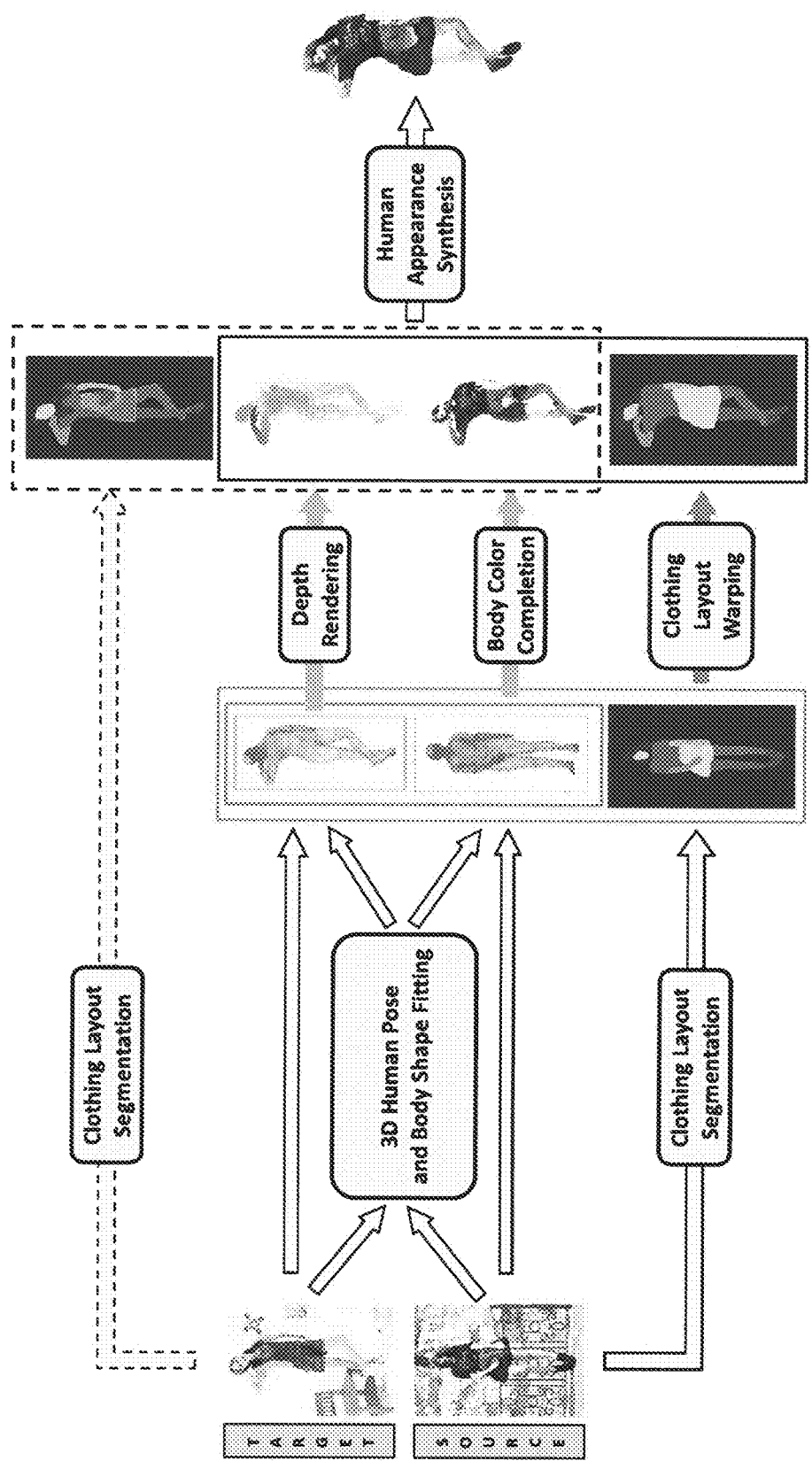
FIG. 2 shows processing phases/modules executed according to an embodiment of the present invention.

FIG. 2 visualizes a human appearance transfer pipeline and particularly the steps executed according to an embodiment of the present invention. The embodiment of FIG. 2 reflects and supplements the embodiments of FIGS. 21 and 22, i.e. the aspects described in FIGS. 21 and 22. According to the embodiment of FIG. 2, given only a single source and a single target image, each containing a person, with different appearance and clothing, and in different poses, our goal is to photo-realistically transfer the appearance from the source image onto the target image while preserving the target shape and clothing segmentation layout. The problem is formulated in terms of a computational pipeline that combines (i) 3d human pose and body shape fitting from monocular images shown in FIG. 3, together with (ii) identifying 3d surface colors corresponding to mesh triangles visible in both images, that can be transferred directly using barycentric procedures, (iii) predicting surface appearance missing in the target image but visible in the source one using deep learning image synthesis techniques—these will be combined using the Body Color Completion Module detailed in FIG. 5. The last step, (iv), takes the previous output together with the clothing layout of the source image warped on the target image (Clothing Layout Warping) and synthesizes the final output. If the clothing source layout is similar to the target, we bypass the warping step and use the target clothing layout instead.

3D Human Pose and Body Shape Fitting

Figure 3:
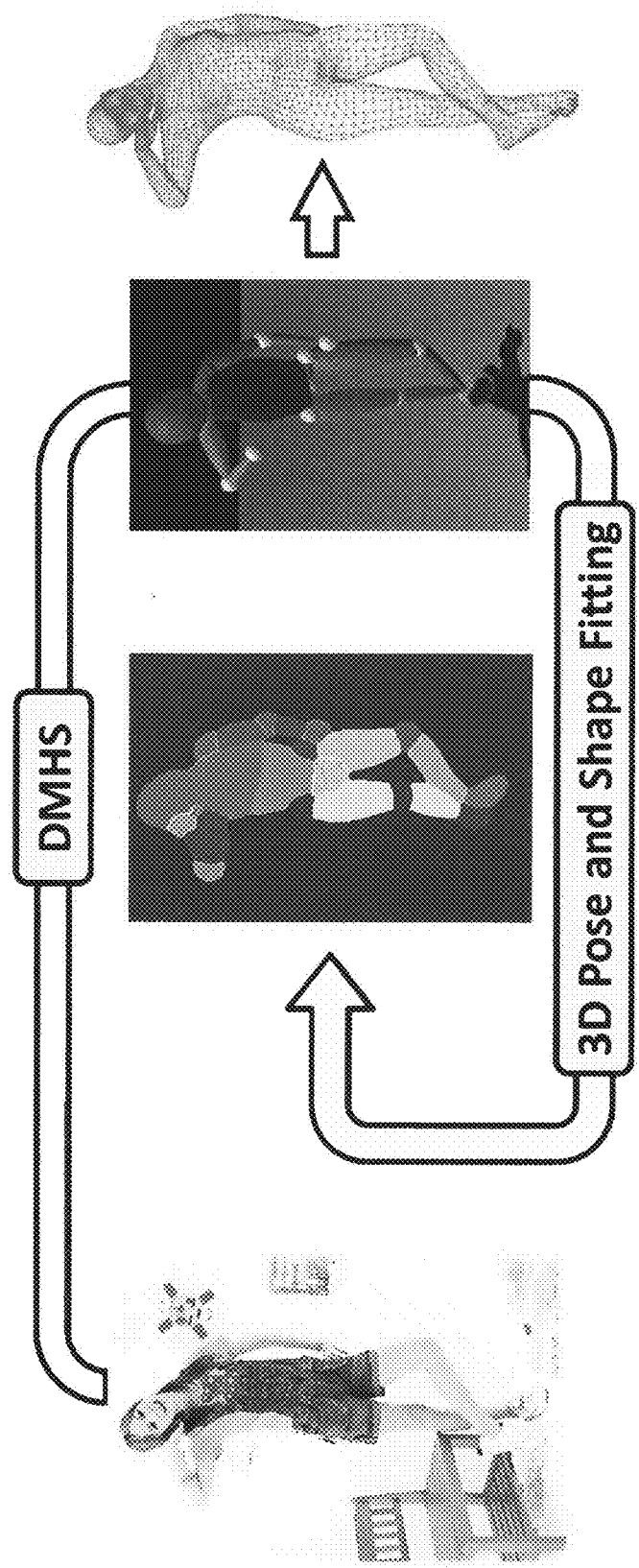
FIG. 3 shows concept of the 3d human pose and body shape fitting according to an embodiment of the present invention.

FIG. 3 visualizes the concept of the 3d human pose and body shape fitting module shown in FIG. 2 and described in FIGS. 21 and 22 with regard to the determining of the first 3d human pose and body shape fitting model 2103 and the second 3d human pose and body shape fitting model 2104. Given an image of a person, 2d joint locations, semantic body part segmentation and 3d pose are obtained using a multitask deep neural network method such as the Deep Multitask Human Sensing (DMHS) network. The 3d human pose estimates, obtained by applying the DMHS on the image of the person, are then refined by non-linear optimization, in order to align an articulated human body mesh with the semantic segmentation layout computed by a module like DMHS. The non-linearly optimized model produces image fits which tightly cover the body layout and enable a good quality appearance transfer.

Human Detection & Body Parts Segmentation.

To detect each person and infer critical semantic and geometric information, each image is fed through the Deep Multitask Human Sensing (DMHS) network (see, e.g., A. I. Popa, M. Zanfir, and C. Sminchisescu: "Deep Multitask Architecture for Integrated 2D and 3D Human Sensing", in CVPR, July 2017: wherein the disclosure of said document is incorporated herein by reference), a state-of-the part predictor for body part labeling (semantic segmentation) and 3d pose estimation.

DMHS is a multitask deep neural network which, given and image of a person, computes estimates for the human body joints of the person (e.g. shoulder, elbow, knee), semantic segmentation of body parts (the assignment of each pixel to one of the body parts, e.g. head, torso, left upper-arm, right arm, etc.) as well as 3-dimensional positional estimates for the human body joints. The multi-task nature of the model makes it possible to train it with either partial or complete supervision in the form of 2d human body joints annotations, semantic segmentation of body parts annotations, or 3d human pose annotations.

DMHS is a multi-stage architecture in which each stage refines the output from the previous stage, producing a tuple $(J;B;R)$, where $J \in \mathbb{R}^{18 \times 2}$ is the set of 2d body joint configurations, $B \in \mathbb{R}^{w \times h \times 24}$ is the body part labeling map, and $R \in \mathbb{R}^{17 \times 3}$ is the 3d body joint configuration of the person detected in an image.

Computation using DMHS is structured using multiple stages of processing. Conceptually, each of stages of processing produces recognition and reconstruction estimates and is constrained by specific training losses. Specifically, each stage t is split into semantic processing $S_t$ and 3d reconstruction, $R_t$. At the same time, the semantic module $S_t$ is divided in two sub-tasks, one focusing on 2d pose estimation, $J_t$, and the other on body part labeling and figure-ground segmentation. $B_t$. The first (i.e. $J_t$) feeds (.e. produce outputs that become inputs) into the second one (i.e. $B_t$), while the semantic stages feed into the reconstruction stages. Each task consists of a total of six recurrent stages which take as input the image, the results of previous stages of the same type (except for the first one), as well as inputs from other stages (2d pose estimation feeding into semantic body part segmentation, and both feeding into 3d pose reconstruction). The inputs to each stage are individually processed and fused via convolutional networks in order to produce the corresponding outputs.

FIG. 3 visualizes a result of the DMHS when applied on an image of a person. Semantic body part segments, 2d joint locations, and 3d pose estimates are shown in different colors.

3d Body Shape Fitting.

We use the prediction of DMHS with the fitting method of A. Zanfir, E. Marinoiu, and C. Sminchisescu. Monocular: "3D Pose and Shape Estimation of Multiple People in Natural Scenes—The Importance of Multiple Scene Constraints", in CVPR, 2018 (the disclosure of said document is included herein by reference) in order to estimate the human 3d body shape and pose from an image. The representation is here circumstantially based on the 3d SMPL body model (see M. Loper, N. Mahmood, J. Romero, G. Pons-Moll, and M. J. Black. Smpl: "A skinned multi-person linear model". SIGGRAPH, 34(6):248, 2015; wherein the disclosure of said document is incorporated herein by reference). However, any 3-dimensional mesh with an associated skeleton rigged to it would work. A commonly used pipeline for fitting the model (see F Bogo, A. Kanazawa, C. Lassner, P. Gehler, J. Romero, and M. J. Black: "Keep it smpl: Automatic estimation of 3d human pose and shape from a single image", in ECCV. 2016; wherein the disclosure of said document is incorporated herein by reference) relies on minimizing a sparse cost error over detected 2d human joint locations. However, the method of A. Zanfir, E. Marinoiu, and C. Sminchisescu: "Monocular 3D Pose and Shape Estimation of Multiple People in Natural Scenes—The Importance of Multiple Scene Constraints", in CVPR, 2018 (wherein the disclosure of said document is incorporated herein by reference) utilizes all information available in the tuple (J;B;R) and the image. The 3d pose is initialized using R and refined so that each body part of the model aligns with the corresponding semantic segmentation labels in the image, based on DMHS estimates J and B (see FIG. 3).

Single Person Feedforward Feedback Model: Semantic 3d Pose and Shape Feedback

After transferring the pose from DMHS to SMPL we obtain an initial set of parameters $\theta^0$ and $\beta^0$ and one can refine the initial DMHS estimate. One way to fit the 3d pose and shape model starting from an initialization (see F. Bogo, A. Kanazawa, C. Lassner, P. Gehler, J. Romero, and M. J. Black: "Keep it SMPL: Automatic estimation of 3d human pose and shape from a single image", in ECCV, 2016: C. Sminchisescu and B. Triggs: "Estimating Articulated Human Motion with Covariance Scaled Sampling", IJRR, 22(6):371-393, 2003; wherein the disclosures of said document are included herein by reference), is to minimize the projection error between the model joints and the corresponding detected image joint locations, y2d. We denote by $\mathcal{P}(\cdot)$ the image projection function, with fixed camera intrinsincs. One possible loss is the Euclidean distance, computed over sparse joint sets weighted by their detection confidence w (some may not be visible at all)

$$\Phi_j = \sum_{j=1}^m w_j \|y^{2d}(j) - \mathcal{P}(x(j)+t)\| \quad (8)$$

The problem of minimizing $\theta$ and $\beta$ for monocular error functions, defined over distances between sparse sets of joints, is its ambiguity, as the system is clearly underdetermined, especially for depth related state space directions that couple along camera's ray of sight (see C. Sminchisescu and B. Triggs: "Kinematic jump processes for monocular 3d human tracking", in CVPR, 2003; wherein the disclosure of said document is incorporated herein by reference). We propose a new error function based on projecting the mesh v in the image I and measuring the dense, pixel-wise semantic error between the semantic segmentation transferred by the model projection and a given DMHS semantic body part segmentation prediction $y_S$.

We are given $N_S$ semantic classes that describe body parts with $y_S$ storing semantic confidence maps. We construct a function $f_S(p=(x,y)^T = \operatorname{argmax}_k y^S(p,k)$ with $1 \leq x \leq W$, $1 \leq y \leq H$ integers, that returns the body part label $1 \leq k \leq N_S$ of pixel location p in the image I. Let $V_k$ be vertices pertaining to the body part indexed in k and $p^k = \mathcal{P}(v^k(j)+t)$ their image projection.

We design a cost $\Phi_S(\Theta,B,T)$, where each point p from the semantic body part segmentation maps finds its nearest neighbour in $p^k$, and drags it in place. Appropriately using pixel label confidences (x, y) for a given class k as $y^S$ is important for robust estimates in a cost that writes $$\Phi_S = \sum_{k=1}^{N_S} \sum_{\substack{p \\ f_S(p)=k}} y^S(p,k) \min_{1 \leq j \leq N_S} \|p - p_j^k\| \quad (9)$$

In practice, our semantic cost is further weighted by a normalization factor 1/Z, with $Z = \sum_{k=1}^{n_x} [[f_S(p)=k]]$ ensuring $\phi_S$ remains stable to scale transformations impacting the area of the semantic map (closer or further away, with larger or smaller number of pixels, respectively). Another desirable property of the semantic loss is that when confidences are small, $\Phi_S$ will have a lower weight in the total loss, emphasizing other qualitatively different terms in the cost. The total semantic loss can then be written $$L_S = \Phi_J + \Phi_S \quad (10)$$

The estimated 3d body model consists of a fixed number of $N_v = 6890$ vertices and a set of $N_f = 13776$ faces, $F \in \mathbb{N}^{N_f \times 3}$, that forms the triangle mesh. We define the fitted 3d body shape model as a tuple $S=(C;D;M)$, where $C \in \mathbb{N}^{N_v \times 3}$, encodes the RGB color at each vertex position, $D \in \mathbb{N}^{w \times h}$ encodes the disparity map of the fitted 3d mesh with respect to the image and $M \in \{0,1\}^{N_v}$ encodes the visibility of each vertex. Given the source and target images $I_s$ and $I_t$, we obtain human pose and shape estimates as mesh structures $S_s$ and $S_t$, respectively.

Thus, the result comprises the first 3d human pose and body shape fitting model 2103 in the case of the first/target image 2102 and the second 3d human pose and body shape fitting model 2103 in the case of the second/source image 2102.

Figure 4:
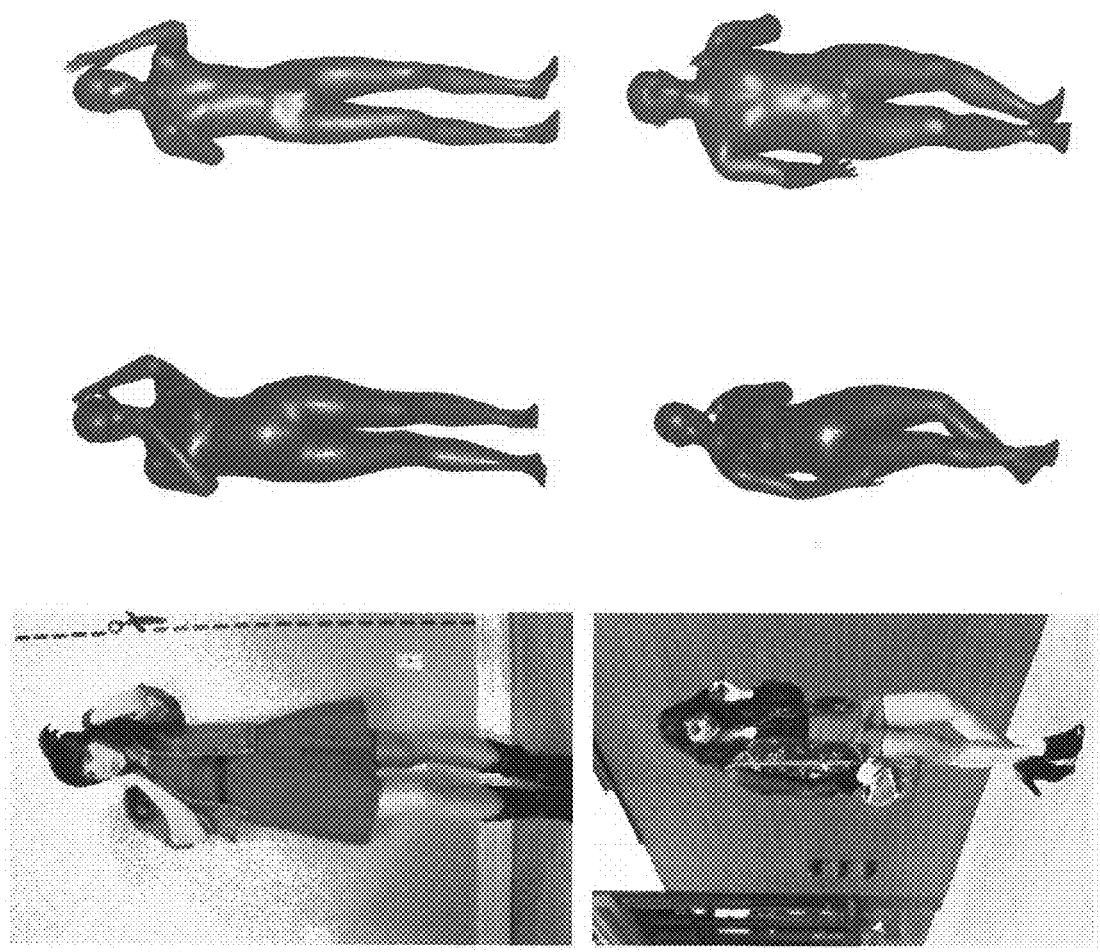
FIG. 4 illustrates improvement of the body shape fitting procedure executed according to an embodiment of the present invention over known methods for estimating 3d human pose and shape.

FIG. 4 illustrates the improvement of the applied body shape fitting procedure over known methods for estimating 3d human pose and shape. Particularly, FIG. 4 illustrates a comparison of 3d human pose and shape estimation results of our employed method (green), that combines the 2d and 3d predictions of a deep multitask neural network with pose refinement, with the results of F. Bogo, A. Kanazawa, C. Lassner, P. Gehler, J. Romero, and M. J. Black: "Keep it smpl: Automatic estimation of 3d human pose and shape from a single image", in ECCV, 2016. As can be seen from FIG. 4, the head and arm orientations of our estimate are closer to the perceived one. This is due to a superior DMHS initialization (as opposed to a canonical T-pose) and the use of dense body parts semantic image segmentation labels during fitting. Particularly, as our model, illustrated in FIG. 3, is initialized using an image-sensitive 3d pose predictor DMHS (as opposed to fixed initialization) and is fitted to the full semantic person layout (the complete semantic segmentation of the person into body parts, as opposed to only a sparse set of human body joints), it tends to better cope with the angle and the orientation of the head and arms, as well as the body proportions.

Clothing Layout Segmentation

As shown in FIG. 2, besides the 3d human pose and body shape fitting, clothing layout segmentation is executed with regard to each one of the target image and the source image. The steps of the 3d human pose and body shape fitting and the clothing layout segmentations may be executed in parallel and/or consecutively. According to an embodiment, in the case where, clothing layout segmentation has been already executed with regard to the source image and/or with regard to the target image, the respective segmentation results can be reused. Thus, due to the reusage of the respective segmentation results, the execution of the corresponding clothing layout segmentation with regard to the corresponding image (i.e. the source and/or target image) is then omitted.

The model to estimate the semantic segmentation of clothing is a deep neural network trained to predict the clothing labels associated to different image pixels, based on a training set of image with clothing labels associated to each pixel.

Depth Rendering

As shown in FIG. 2, depth rendering is executed with regard to the target image. We refer to depth rendering as mean the process of turning a depth-map associated to our 3d body model in a particular 3d pose, into a grayscale image. This process is straightforward by using the z-buffer of the graphics card which stores such a representation already and simply normalizing the distances in the z-buffer to the grayscale image range.

The input to the depth rendering process is the 3d body model. The output is an image of the projected body model where each pixel represents the distance (i.e. depth) to the camera to of the visible surface points of the mesh. The projection equation follows the perspective camera model and we use a set of predefined camera parameters. As we only have 3d information of the vertices of the model, the 3d positions of the surface points inside the 3d triangles are computed using barycentric interpolation.

The depth rendering is used in the final stage of our pipeline, as input for the Human Appearance Synthesis deep network. Empirically, we notice that this type of information helps the network to be aware of the underlying 3d geometry when applying convolutional operators in the image space.

Body Color Completion

Figure 5:
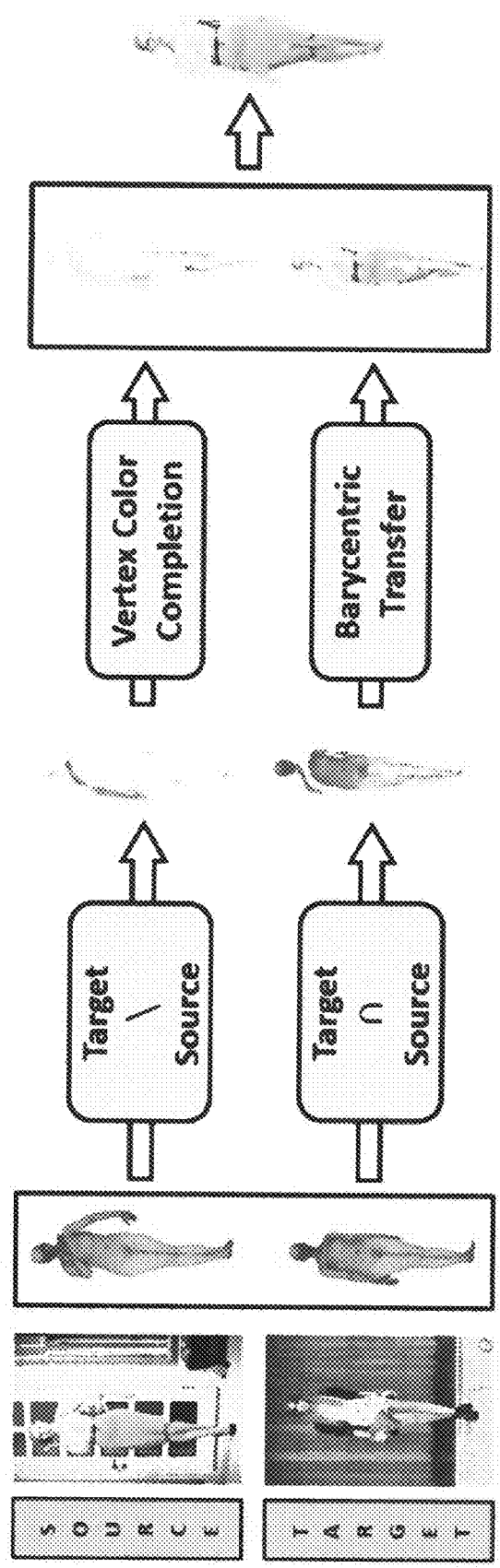
FIG. 5 shows a body color completion module/process according to an embodiment of the present invention.

FIG. 5 shows a Body Color Completion module or process. When considering FIGS. 21 and 22, the Body Color Completion module/process of FIG. 5 reflects and describes in more detail specific embodiments of processes/modules 2105 to 2108 and 2208 in FIGS. 21 and 22. Given a Source (S) and a Target (T) image, with 3d human pose and shape fitted automatically and represented using 3d meshes, we compute two sets of mesh vertices: ones that are visible in both images (T∩S), and ones that are only visible in the target T\S. We propagate (copy) the color of the intersection set using barycentric transfer and predict the difference set using a vertex color completion network. The network is trained to predict a subset of vertex colors from other subsets of vertex colors. Training data for this network can be readily available by sampling any 'cut' through the set of visible vertices obtained by fitting a 3d model to a single image. However, in practice we make training more typical by using targets that come from S\T in pairs of images.

We are first interested in estimating the pixel colors for the projected visible surface of $S_t$, denoted as $I_{s \to t}$, using the pixel colors on the projected visible surface of $S_s$.

Barycentric Transfer.

We begin by defining the common set of visible vertices $\Lambda_{s \wedge t} = \{i | M_t(i) = 1 \wedge M_s(i) = 0, 1 \le i \le N_v\}$ and select the corresponding mesh faces $F(\Lambda_{s \wedge t})$. For each face $f \in F(\Lambda_{s \wedge t})$, we project it on $I_s$ and $I_{s \to t}$. For each pixel location in the projection of f on $I_s$, we find its corresponding pixel location in the projection on $I_{s \to t}$ using barycentric triangle coordinates. Finally, we copy the color information from one location to another.

Vertex Color Completion Network.

The Remaining Set of Visible Vertices in $S_t$, $\Lambda_{s \setminus t} = \{i | M_t(i) = 1 \wedge M_s(i) = 0, 1 \le i \le N_v\}$ needs to be colored. We rely on learning the implicit correlations among various body parts in order to propagate appearance information from the already colored vertex set $C_s$ to $\Lambda_{s \wedge t}$. Such correlations, effectively forms of pattern to completion, are learned automatically from training data using a neural network.

Learning for Mesh Color Completion.

We are given as inputs the color set $C_s$, the visibility mask $M_s \in \{0,1\}^{N_v \times N_v}$ and a binary mask that encodes the vertices we wish to color $M_{\Lambda_{t|s}} \in \{0,1\}^{N_v \times N_v}$, i.e. visibility values are replicated along columns. The output is represented by the predicted colors $C^*_{\Lambda_{t|s}} \in \mathbb{R} 3 \times N_v$. We define two weight matrices $W_1 \in \mathbb{R}^{N_v \times N_v}$ and $W_2 \in \mathbb{R}^{N_v \times N_v}$. Our network optimizes over these two matrices with the loss L defined as the Euclidean distance between the prediction $C^*_{\Lambda_{t|s}}$ and the ground-truth colors $C_{\Lambda_{t|s}}$:

$$W^*_1 = \text{softmax}(W_1 \odot M_s) \quad (1)$$

$$W^*_2 = \text{softmax}(W_2 \odot M_s \setminus M_{\Lambda_{t|s}}) \quad (2)$$

$$C^*_{\Lambda_{t|s}} = (C_s^T \times W^*_1) \times W^*_2 \quad (3)$$

$$L(W_1, W_2) = \|C_{\Lambda_{t|s}} - C^*_{\Lambda_{t|s}}\| \quad (4)$$

where the softmax function is applied column-wise. Intuitively, any visible target vertex, without color, will have it assigned to the weighted mean (softmax function) of all the available colored vertex set, with weights encoded in matrices $W_1$ and $W_2$. We interpolate the predicted vertex colors $C_{\Lambda_{t|s}}$ from the learned model over the corresponding mesh faces $F(\Lambda_{t|s})$, project the faces, and obtain the missing regions in $I_{s \to t}$.

The architecture of the network is composed of two fully connected layers (see eq. 3), that operate on the colored vertices set, $C_s$, and estimate the color for all the uncolored vertices on the body model. These fully connected layers use the parameter matrices $W_1$ and $W_2$ (see eq. 1 and 2) in the calculations involved. During the learning process, these matrices are updated each learning iteration through means of standard backpropagation from the final loss function (see eq. 4).

Generating Training Samples. The training data consists of inputs, each being a subset of colored vertices from a mesh, and outputs that represent different subsets of vertices from the same mesh. In practice, given any monocular image, once we fit the 3d model, we can generate any possible input-output split over the visible vertices. However, our inputs tend to be structured, consisting of subsets of vertices seen in the source and target mesh as well as their difference set. To ensure a similar distribution, we take the inputs and outputs to be sets of visible vertices in the intersection of the source and target mesh (we assume intersection is non-trivial), and choose outputs in their difference sets, respectively. Two training examples can to thus be generated, symmetrically, for every pair of images of people, with different appearance and in a different pose.

Here, at training time, the network has to predict colors from a smaller intersection set of colored vertices (i.e. $\Lambda_{s \wedge t}$), whereas at test time, it can use the fully colored set of vertices from the source mesh $C_s$.

Clothing Layout Warping

We use the model of K. Gong, X. Liang, X. Shen, and L. Lin: "Look into person: Self-supervised structure-sensitive learning and a new benchmark for human parsing", in CVPR, July 2017 to estimate the clothing layout for target and source images, $L_t$, and $L_s$, defined over a set of 20 clothing labels. Given the clothing layout source $L_s$, we want to transform it into the pose of the target image, $L_{s \to t}$. We start by collecting clothing label information for each visible vertex in the source mesh $S_s$. We propagate the labeling on the entire mesh by using a geodesic nearest-neighbor approach, as follows: for each unlabeled vertex (i.e. visible in the target image, but not in the source image), we compute its nearest labeled (i.e. with a clothing label) neighbor using the Djikstra algorithm on the body mesh, and we assign it that label. For labeled pixels that fall outside the projection of the source mesh, we collect their nearest-neighbors (using 2d pixel distance) that fall inside the projection of the source mesh. We place these outside labeled pixels in the target image, at a location given by the original position in the source and by adding the mean displacement of their nearest neighbors (that correspond to points on the mesh), from source to target. Thus, we obtain a rough estimate of $L_{s \to t}$, which will denote by $L_{s \to t}$. We gather additional image data from the web, consisting of source-target image pairs depicting the same person wearing the same clothes, but in different poses. On this dataset of ~1,500 training pairs, we train a clothing layout synthesis network that outputs $L_{s \to t}$, given $L_{s \to t}$ and the disparity map $D_t$. This network learns to refine our initial estimate $L_{s \to t}$, using supervision in the form of real pairs of clothing labeling in both source and target images. The architecture used is a standard encoder-decoder with an L2 loss.

Figure 6:
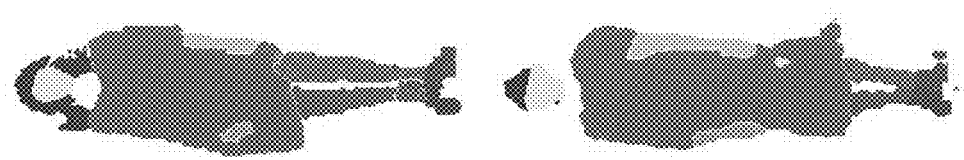
FIG. 6 shows clothing layout warping executed according to an embodiment of the present invention.
Figure 6:
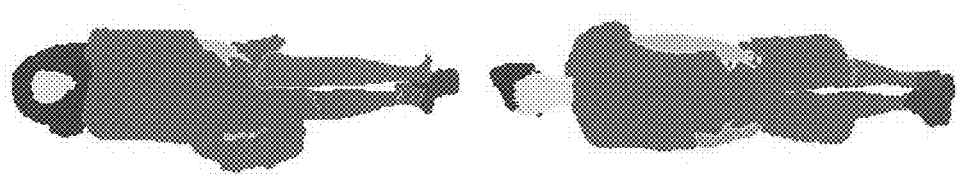
Figure 6:
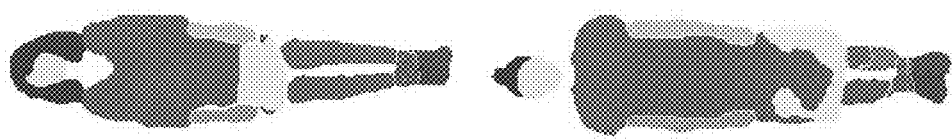
Figure 6:
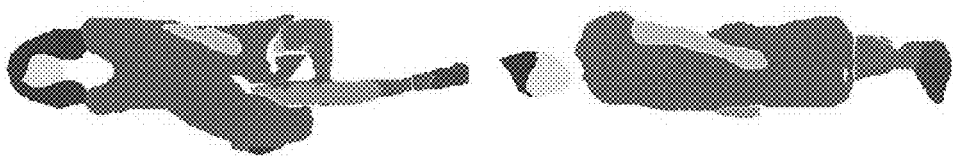

FIG. 6 shows clothing layout warping. From left to right: source image clothing layout $L_s$, target image clothing layout $L_t$, input of the clothing layout synthesis network $L_{s \to t}$, final output of the warping network $L_{s \to t}$.

Human Appearance Synthesis

It is noted that the Human Appearance Synthesis described in the following represents a more specific embodiment of processes/modules 2109 and 2209 of FIGS. 21 and 22.

The previously described prediction $I_{s \to t}$, captures the appearance transfer only as covered by our 3d body models. Hence, clothing layers (e.g. skirt, jacket) or hair, which fall outside the coverage of the human body model, are not transferred during the process. To achieve a higher perceptual quality for the generated image, we further refine our prediction using a Human Appearance Synthesis (HAS) network adapted based on ideas in Q. Chen and V. Koltun: "Photographic image synthesis with cascaded refinement networks" in ICCV. October 2017 (wherein the disclosure of said document are included herein by reference). This method performs multi-resolution refinement and was originally used in synthesizing photographic images conditioned on semantic segmentation layouts. The HAS network architecture is the same as in the referenced work of Chen & Koltun, ICCV 2017. The main difference is that we adapt it to use a different type of input (please check below) and train it on our own data. We train the network to predict an image $I_t$ given three types of inputs: a predicted semantic layout of clothing $L_t$ or $L_{s \to t}$, the disparity map $D_t$, and $I_{s \to t}$. The output of this HAS network, $I_{s \to t}$, represents our final, refined result.

The inputs of the HAS network are the concatenated outputs of the following modules: "Clothing Layout Segmentation", "Depth Rendering" and "Body Color Completion". The first input, "Clothing Layout Segmentation", is a binary 3d tensor with the same spatial extent as the source image and a number of 20 channels along the third dimension (i.e. the vocabulary of clothing items is limited to 20 in our model design). Each channel corresponds to a specific clothing item and it encodes its image support. The second input, "Depth Rendering", encodes the depth of each visible vertex belonging to the 3d human body model within the image plane (please see section Depth Rendering for a more detailed description). The third input, "Body Color Completion" is an RGB image representing the coloring of the human body (please see section Body Color Completion for more details). Experimentally, we show that HAS achieves the best performance when using all these three input components.

Figure 7:
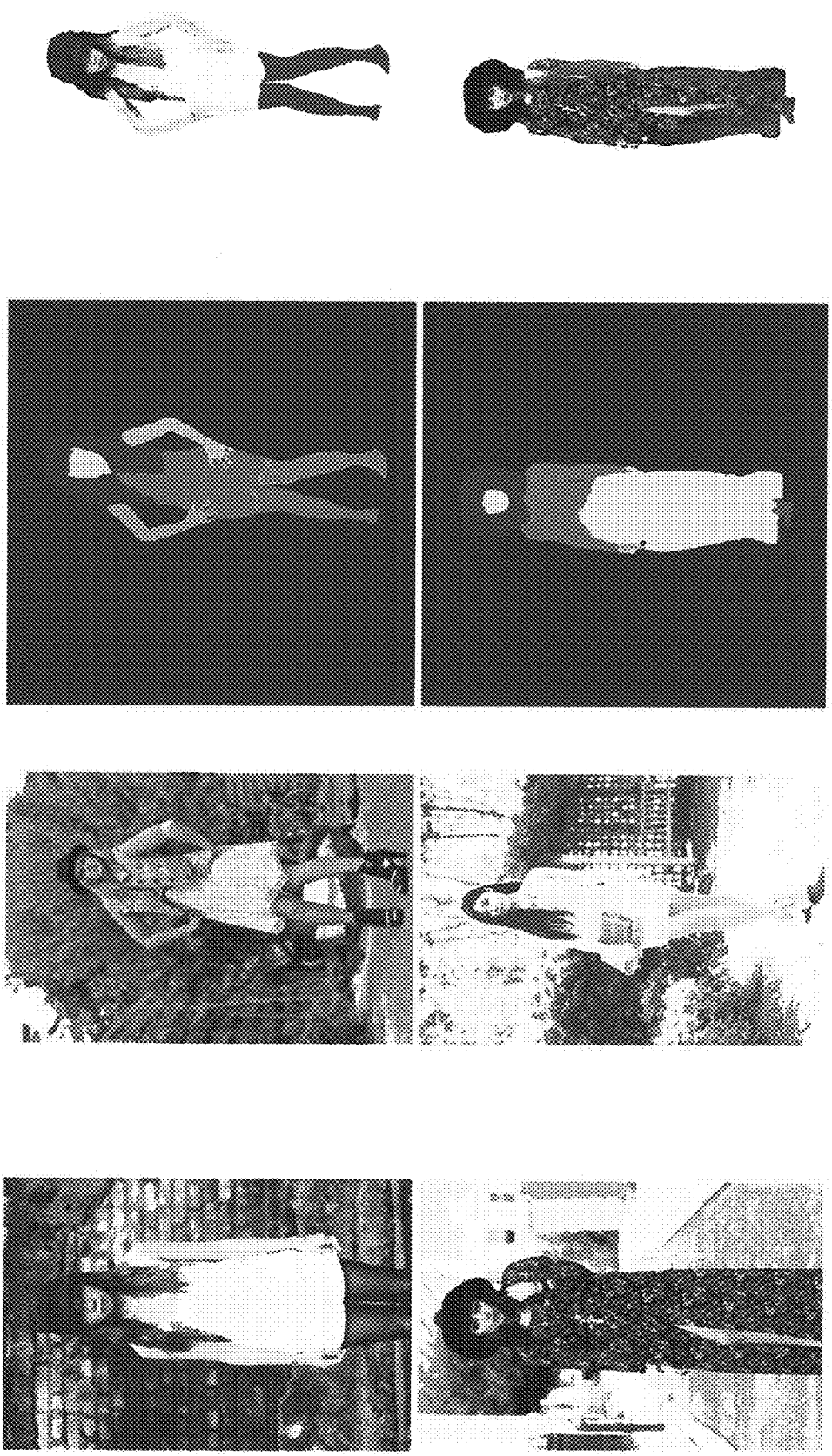
FIG. 7 shows human appearance transfer with clothing layout warping according to an embodiment of the present invention.

FIG. 7 shows human appearance transfer with clothing layout warping. From left to right: source image, target image, clothing warped $L_{s \to t}$ and RGB data, $I_{s \to t}$, generated using the human appearance synthesis module.

Experiments

For all of our experiments we use the Chictopia 10 k dataset (see X. Liang, C. Xu, X. Shen, J. Yang, S. Liu, J. Tang, L. Lin, and S. Yan: "Human parsing with contextualized convolutional neural network"; in ICCV, 2015; wherein the disclosure of said document is incorporated herein by reference). The images in this dataset depict different people, under both full and partial viewing, captured frontally. The high variability in color, clothing, illumination to and pose makes this dataset suitable for our task. There are 17,706 images available together with additional ground truth clothing segmentations. We do not use the clothing labels provided, but only the figure-ground segmentation such that we can generate training images cropped on the human silhouette.

We split the data in two subsets: 15,404 images for training and 2,302 images for testing. We additionally prune some of the images based on the quality of body shape fitting. This is done by applying a soft threshold on the intersection over union (IoU) between the projection of the fitted body model and the foreground mask of the person. For each image in the dataset, we randomly select two other images from its corresponding subset (i.e. train or test) to construct image pairs. In the end, we use 28,808 training pairs and 4,080 testing pairs.

Appearance Transfer.

Figure 9:
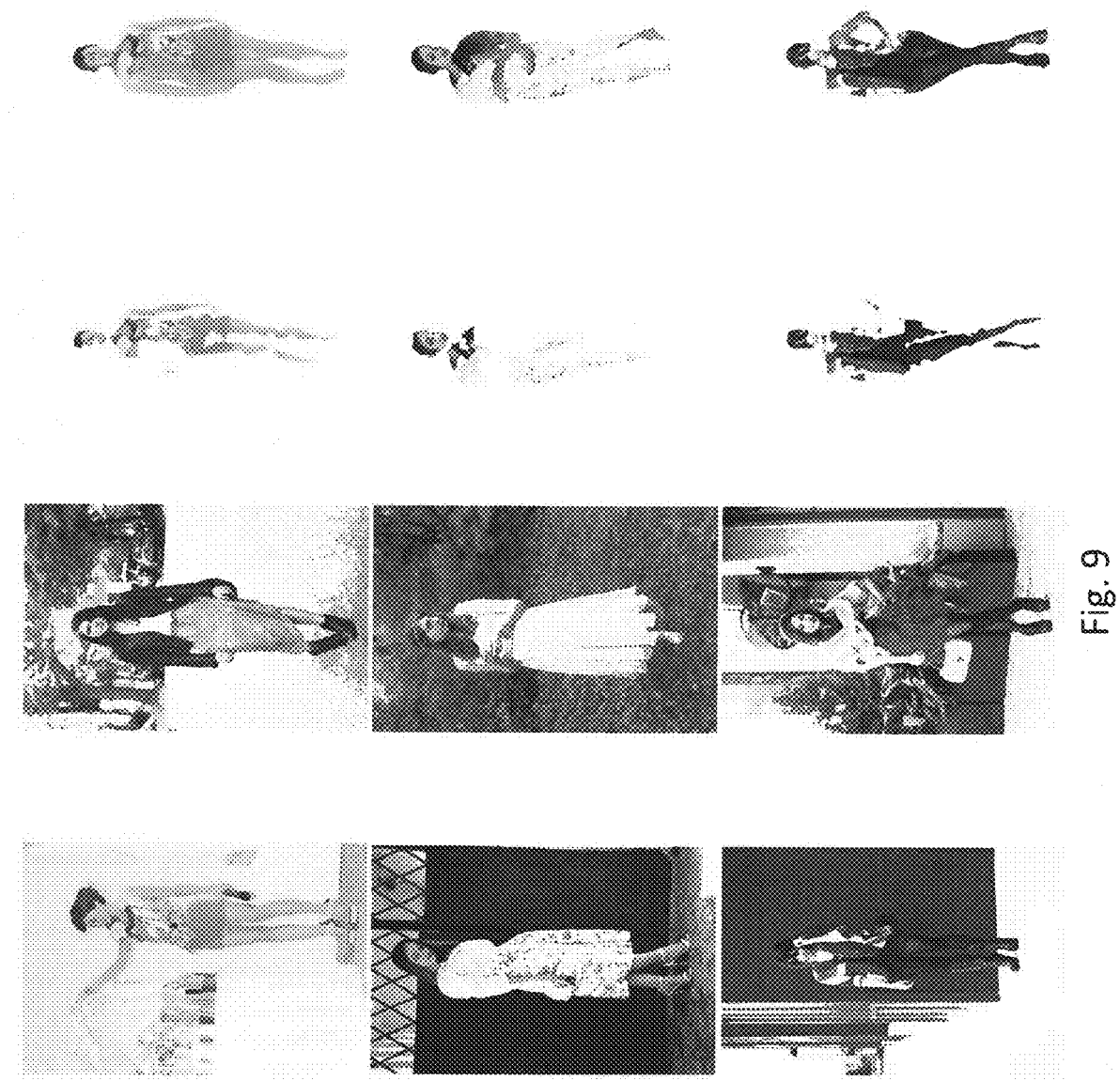
FIG. 9 shows sample results for body color completion module/process according to an embodiment of the present invention.

Results of our Body Color Completion module are shown in FIG. 9. Sample results of our Human Appearance Synthesis module are also given in FIG. 10. Although we show transfer results in one direction, our method is symmetrical, so we obtain results of similar quality both ways, as shown in FIG. 1.

FIG. 9 shows sample results for the body color completion module. From left to right: source image, target image, appearance data copied using visible mesh triangles on both meshes (source and target), appearance data completed using vertex color completion.

Figure 10:
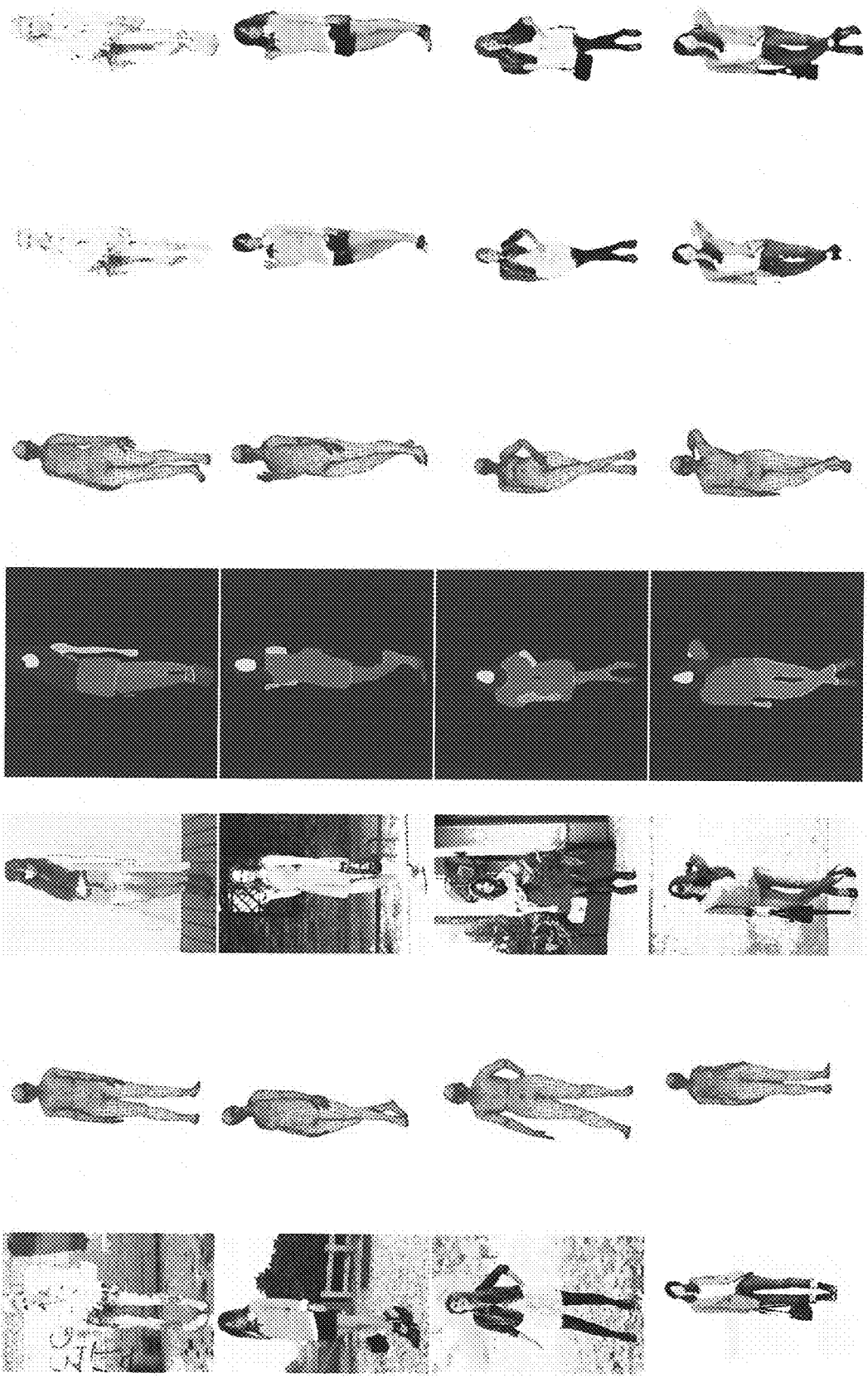
FIG. 10 shows sample results for human appearance transfer/synthesis according to an embodiment of the present invention.

FIG. 10 shows sample results for the human appearance transfer pipeline. From left to right: source image with corresponding fitted 3d body model, target image with its clothing layout and fitted 3d body model, RGB data generated using the Body Color Completion module (i.e. $I_{s \to t}$), RGB data generated using the Human Appearance Synthesis module (i.e. $I_{s \to t}$).

Impact of Components and Failure Modes.

Figure 11:
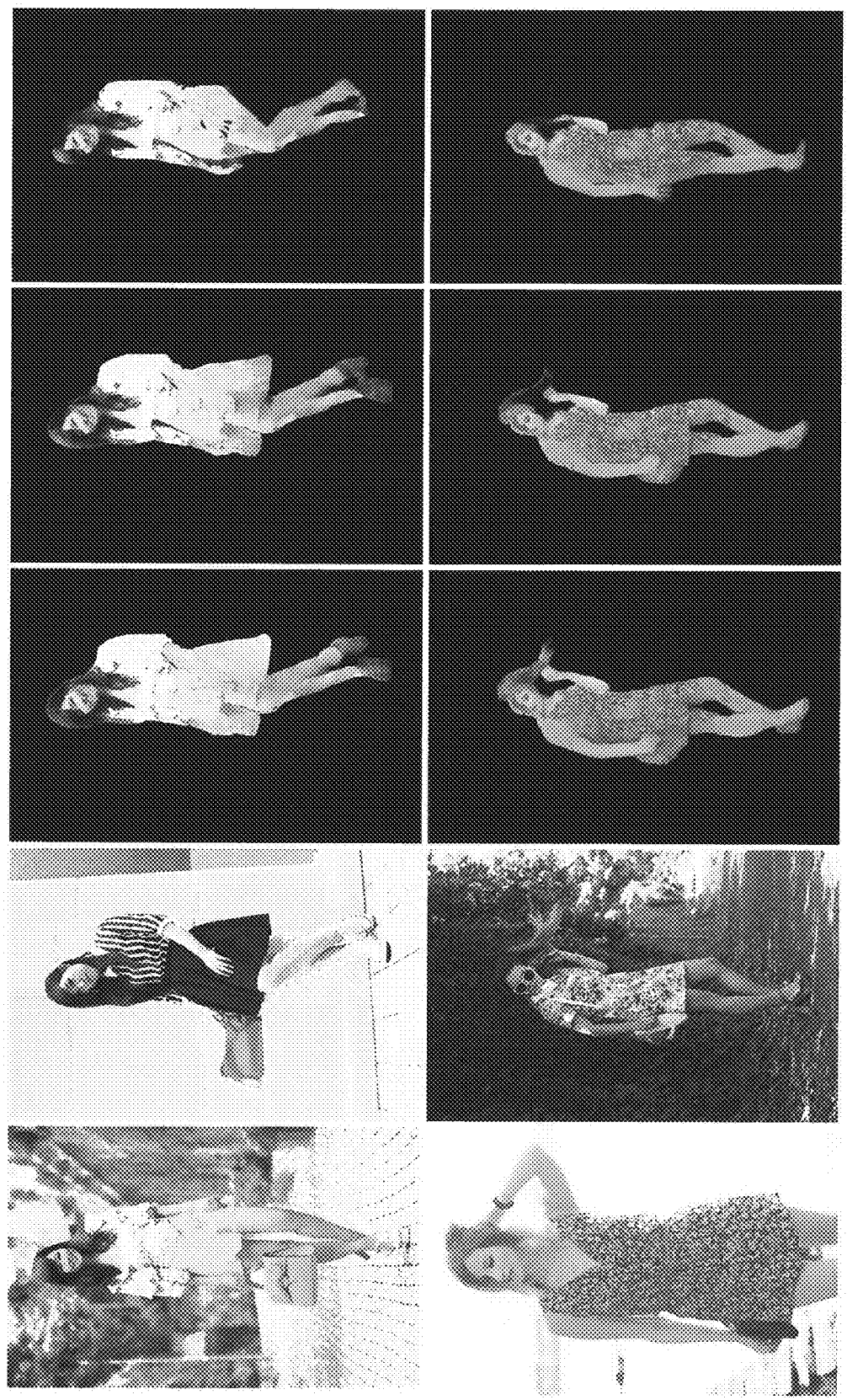
FIG. 11 shows results of three human appearance synthesis networks.

Our Human Appearance Synthesis network receives as inputs $I_{s \to t}$, the depth map and the clothing segmentation of the target image. To evaluate the contribution of each of these inputs in the visual quality of the output, we train two additional Human Appearance Synthesis networks under similar conditions, but with different input data: one without the depth map, and the other without both the depth map and the clothing segmentation. In FIG. 11, we provide visual results for all three networks. We observe that the best quality is obtained when using the complete network.

FIG. 11 shows impact of the different model components in the effectiveness of human appearance transfer. In the third column we show our complete method, in the fourth column we do not use the depth map and in the fifth column we neither use the depth map nor the clothing segmentation.

For the first example (first row), notice the difference in quality for the girl's skirt (i.e. for the complete network the skirt is fully defined, for the network without depth the skirt becomes blurry and for the network without both depth and clothing, the skirt is nearly in-existent and body detail is blurred). For the second example (second row) notice the improved quality of the generated hair.

Errors occur in our pipeline when the clothing segmentation fails or the 3d body shape fitting does not yield good alignment with the person in the image. Examples are shown in FIG. 12.

Figure 12:
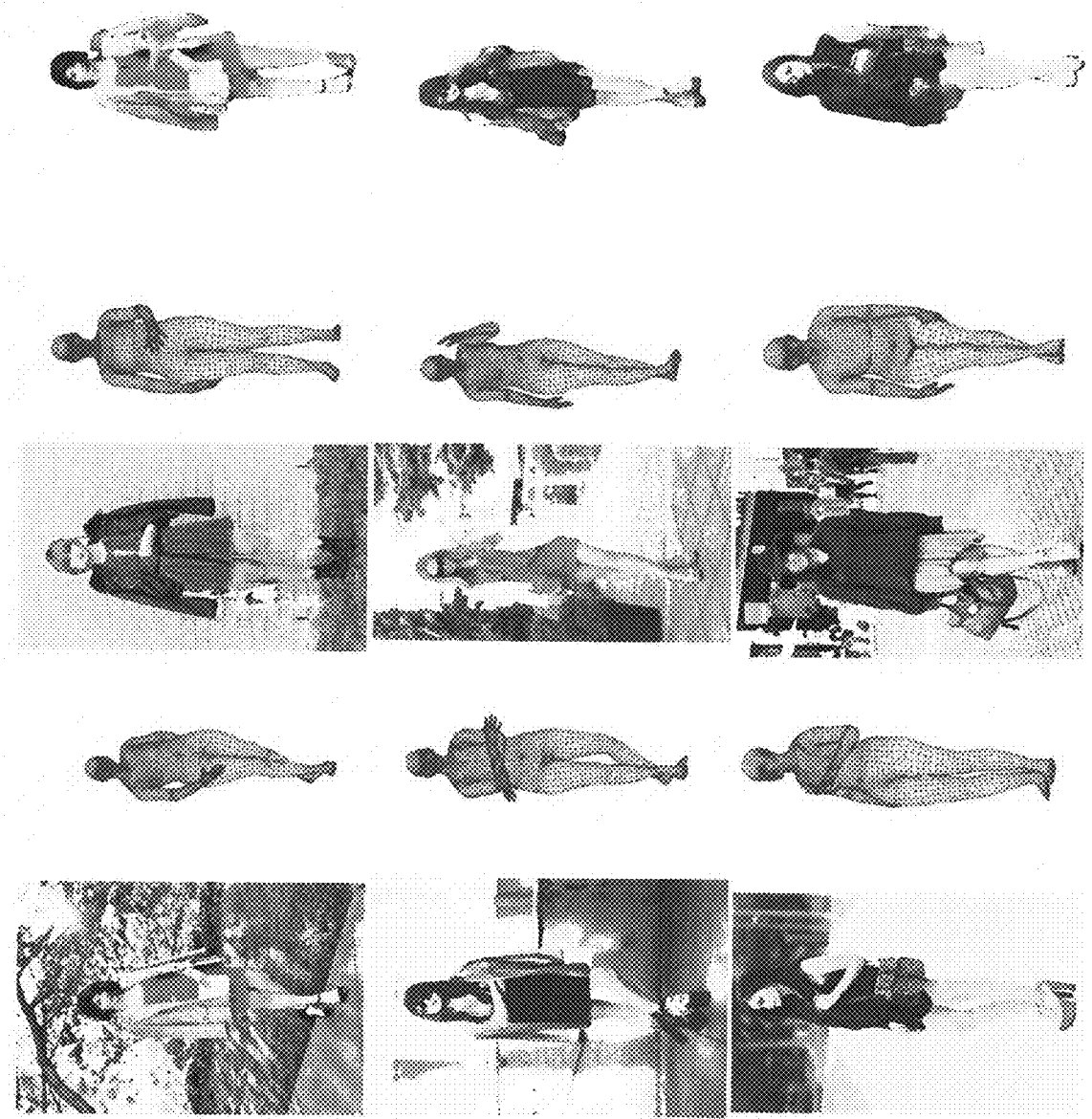
FIG. 12 shows several failure modes.

FIG. 12 shows several failure modes of our method. From left to right: source image $I_s$ with corresponding mesh, target image $I_t$ with corresponding mesh and the generated $I_{s \rightarrow t}$. In the first example the body shape fitting in $I_s$ misses the model's left hand, causing the final output to contain 3 hands, one resulting from barycentric transfer. In the second example, the model has problems dealing with the coat of the person from the source image. In the third example, the issue is caused by the small number of common vertices between the two body shape models, producing appearance mixing and considerable transfer ambiguity.

Identity Preserving Appearance Transfer

We also implement a variation of our model in order to preserve the identity of the target subject during appearance transfer. To do so, we redefine the sets of vertices used in the Body Color Completion module. We start by identifying the skin and clothing image pixels of the target and source images by using the set of labels provided by the clothing segmentation model. We place the set of labels defined by hair, face, arms and legs in the skin category and the remaining ones in the clothing category. Then we assign a category (i.e. skin/cloth) for each vertex in the body models by inspecting the clothing labeling under their projections in the image. We fix the colors for the pixels/vertices categorized as skin in the target, and perform barycentric transfer only for the intersection of source and target vertices categorized as clothing. The colors for the remaining vertices are predicted as before by our Vertex Color Completion network. Sample results are shown in FIGS. 8a and 8b.

Figure 8A:
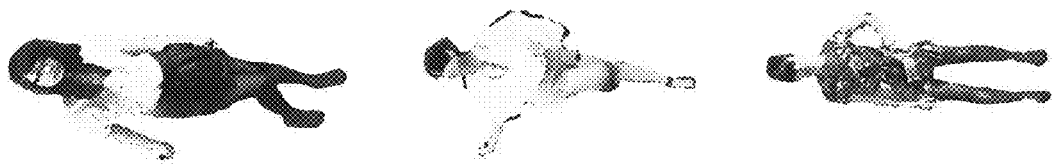
FIGS. 8a and 8b show identity preserving transfer executed according to an embodiment of the present invention.
Figure 8A:
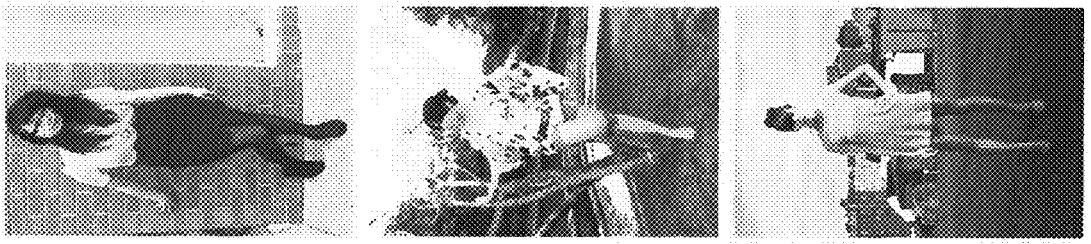
Figure 8A:
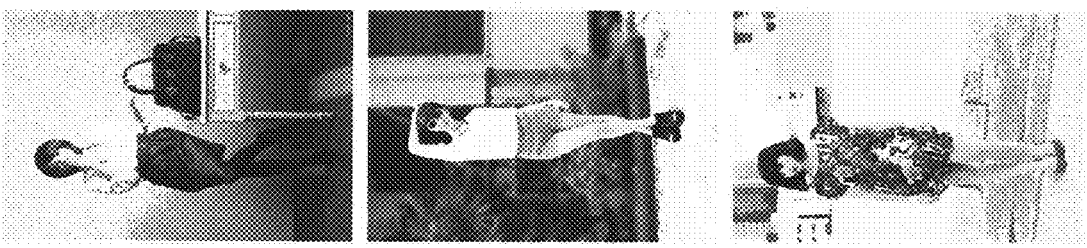
Figure 8B:
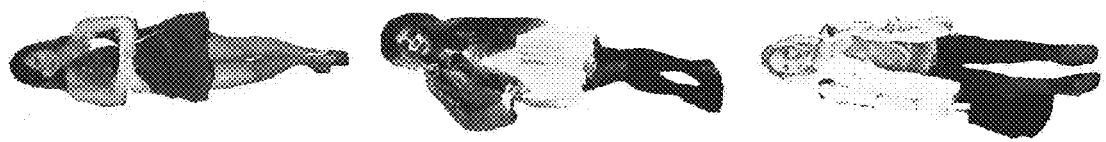
Figure 8B:
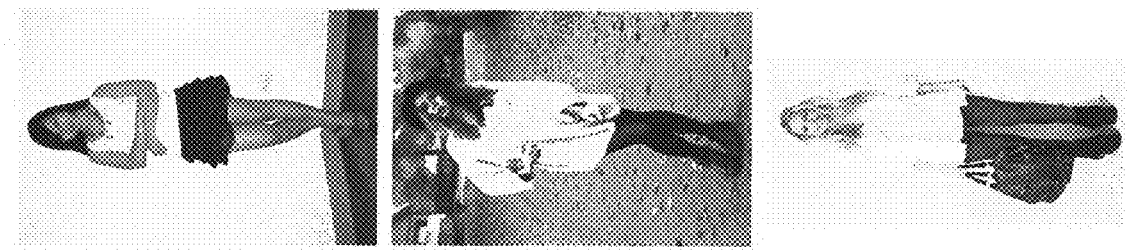
Figure 8B:
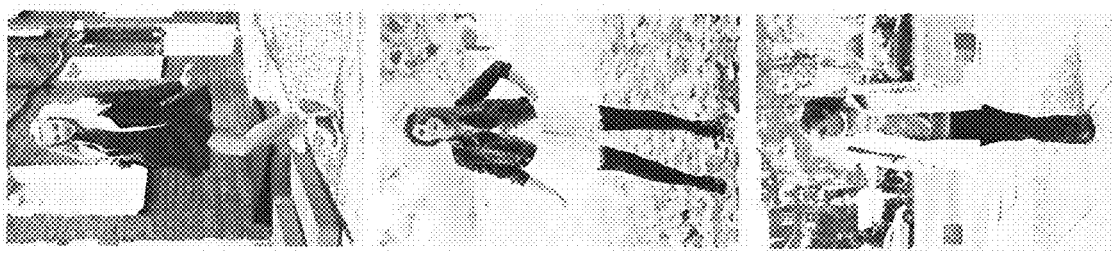

FIGS. 8a and 8b show sample appearance transfer results from $I_s$ to $I_t$, where we preserved the identity of the person from $I_t$. From left to right: source image, $I_s$, target image, $I_t$, generated image with person from $I_t$ using the clothing of person from $I_s$.

Perceptual User Study and Automated Tests

We perform a perceptual study by asking 20 human subjects to evaluate our results. We present each one with 100 results in the form of source image ($I_s$), target image ($I_t$) and our automatically generated appearance transfer image $I_{s \rightarrow t}$. We ask subjects to evaluate the appearance transfer quality of $I_{s \rightarrow t}$, by assigning it one of the following scores: very poor (1), poor (2), good (3), very good (4), perfect (5). Finally, we quantified their scores in the form of a normalized histogram, shown in FIG. 13 (bottom). The mean score is 2.9, with standard deviation 0.96, suggesting that our transfer is reasonable on average.

Figure 13:
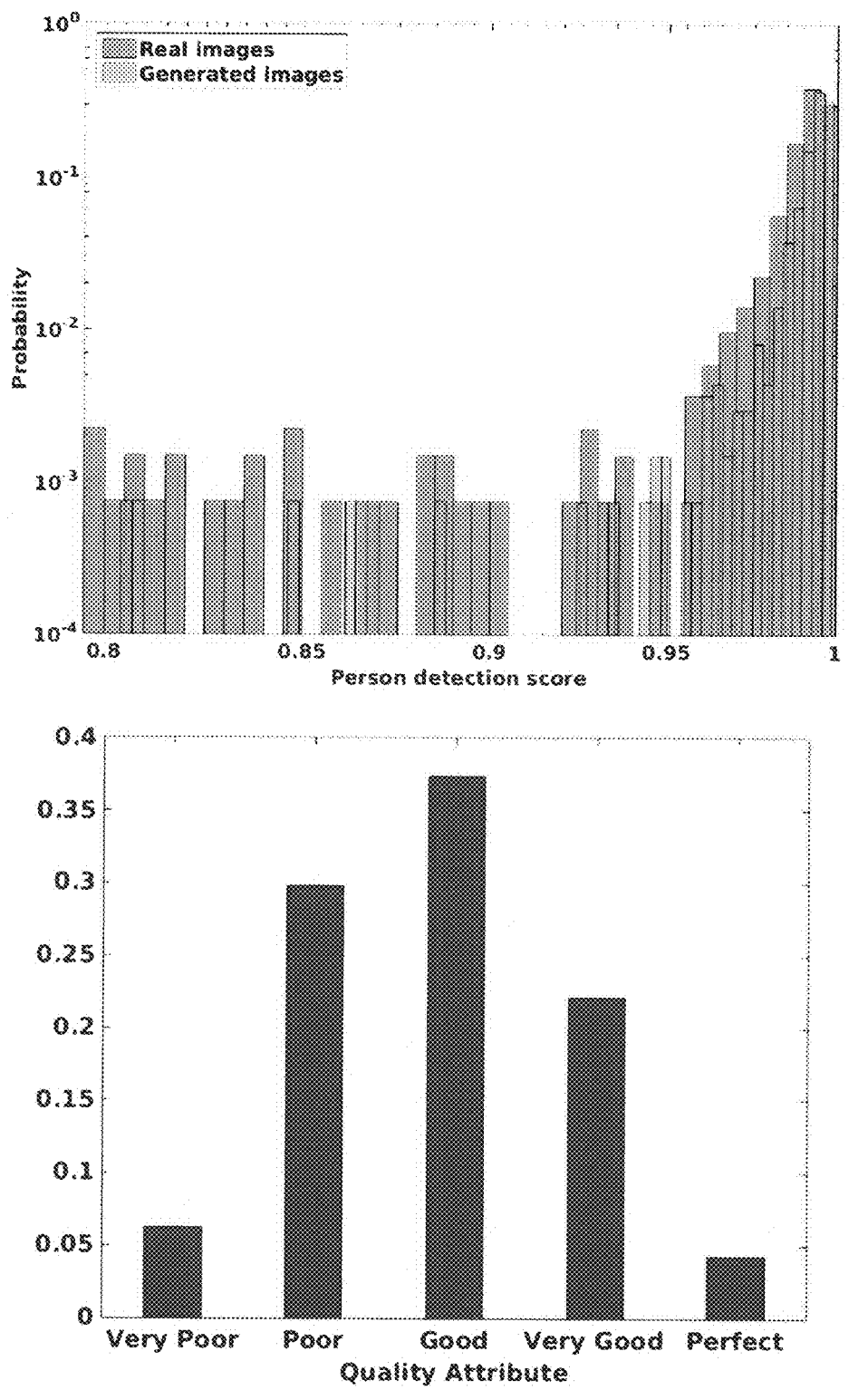
FIG. 13 shows (top) distributions of person detection scores.

FIG. 13 shows (top) distributions of person detection scores given by running Faster R-CNN (see S. Ren, K. He, R. Girshick, and J. Sun. Faster r-cnn: "Towards real-time object detection with region proposal networks", in NIPS, pages 91-99, 2015; wherein the disclosure of this document is incorporated herein by reference) over two sets of real and automatically generated images, respectively. (Bottom) We conducted a quality survey for a set of 100 automatically generated images by our method (randomly selected), where people were asked to assign a score from 1 (very poor quality) to 5 (perfect quality).

We compare our method against recent work (see L. Ma, X. Jia, Q. Sun, B. Schiele, T. Tuytelaars, and L. Van Gool: "Pose guided person image generation", in NIPS, 2017: A. Siarohin. E. Sangineto, S. Lathuiliere, and N. Sebe: "Deformable gans for pose-based human image generation", in CVPR, 2018; disclosures of both documents are incorporated herein by reference) independently addressing the problem of pose conditioned human image generation. Such methods rely solely on information in the image without explicitly inferring 3d body pose. Set aside significant methodological differences, we are additionally able to perform identity-preserving transfer (see FIG. 8). Our results are more visually pleasing and superior in terms of Inception Scores (see T Salimans, I. Goodfellow, W. Zaremba, V. Cheung, A. Radford, X. Chen, and X. Chen: "Improved techniques for training gans", in NIPS, 2016; wherein the disclosure of said document is incorporated herein by reference), which are 3.09 (see L. Ma, X. Jia. Q. Sun, B. Schiele, T Tuytelaars, and L. Van Gool: "Pose guided person image generation", in NIPS, 2017; wherein the disclosure of said document is incorporated herein by reference), 3.35 (see A. Siarohin, E. Sangineto, S. Lathuiliere, and N. Sebe: "Deformable gans for pose-based human image generation", in CVPR, 2018; wherein the disclosure of said document is incorporated herein by reference) and 4.13 (Ours).

In order to understand possible difference in terms of image statistics, we also perform an automated test using a state-of-the-art human detector, Faster R-CNN (see S. Ren, K He, R. Girshick, and J. Sun: "Faster r-cnn: Towards real-time object detection with region proposal networks", in NIPS, pages 91-99, 2015; wherein the disclosure of said document is incorporated herein by reference). We compute the human detection scores on two sets containing 2,000 generated and real images, respectively. In FIG. 13 (top) we observe that the two distributions of detection scores are similar, with a dominant mode around value 0.99.

Conclusions

Modeling and synthesizing human appearance is difficult due to variability in human body proportions, shape, clothing and poses. However, models that can realistically synthesize complete images of humans under a degree of control (conditioning) on an input image appearance or pose, could be valuable for entertainment, photo-editing, or affordable online shopping of clothing. In this context, we define a new problem entitled human appearance transfer where given two images, source and target, of different people with different poses and clothing, we learn to transfer the appearance of the source person on the body layout of the target person. Our solution relies on state-of-the-art 3d human pose and shape estimation based on deep multitask neural networks and parametric human shape modeling, combined with deep photographic synthesis networks controlled by appropriate 2d and 3d inputs. Our image results, backed-up by a perceptual user study, Inception scores, and the response of a state-of-the-art human person detector indicate that the proposed model can automatically generate images of humans of good perceptual quality, and with similar statistics as real human images. We also show how the model can be modified to realistically 'dress' a person shown in one image with clothing captured from a person in another image.

Monocular 3D Pose and Shape Estimation of Multiple People in Natural Scenes

In the following, monocular 3d pose and shape estimation of multiple people in natural scenes will be considered in more detail and supplement the aforesaid.

Human sensing has greatly benefited from recent advances in deep learning, parametric human modeling, and large scale 2d and 3d datasets. However, existing 3d models make strong assumptions about the scene, considering either a single person per image, full views of the person, a simple background or many cameras. In this paper, we leverage state-of-the-art deep multi-task neural networks and parametric human and scene modeling, towards a fully automatic monocular visual sensing system for multiple interacting people, which (i) infers the 2d and 3d pose and shape of multiple people from a single image, relying on detailed semantic representations at both model and image level, to guide a combined optimization with feedforward and feedback components, (ii) automatically integrates scene constraints including ground plane support and simultaneous volume occupancy by multiple people, and (iii) extends the single image model to video by optimally solving the temporal person assignment problem and imposing coherent temporal pose and motion reconstructions while preserving image alignment fidelity. We perform experiments on both single and multi-person datasets, and systematically evaluate each component of the model, showing improved performance and extensive multiple human sensing capability. We also apply our method to images with multiple people, severe occlusions and diverse backgrounds captured in challenging natural scenes, and obtain results of good perceptual quality.

Accurately detecting and reconstructing multiple people, possibly involved in interactions with each other and with the scene, based on images and video data, has extensive applications in areas as diverse as human-computer interaction, human behavioral modeling, assisted therapy, monitoring sports performances, protection and security, special effects, modeling and indexing archival footage, or self-driving cars.

To support the level of modeling accuracy required by such applications, we ultimately need highly-detailed models able not just to detect people and their body joints in images, but also the spatial extent of body parts, as well as the threedimensional pose, shape and motion for each person in the scene. For complex scenes, such demands would likely require a virtuous cycle between 2d and 3d reasoning, with feedback. One should further consider integrating anthropometry constraints, avoiding geometric collisions between the estimated models of multiple people, and reasoning about ground planes implicit in many scenes, as people rarely float, unsupported in space—and if so, usually not for long. Reconstructions must also be temporally fluid and humanly plausible. Most importantly, constraints need to be enforced in the context of an image observation process which—even with many cameras pointed at the scene—remains incomplete and uncertain, especially in scenarios where multiple people interact. While the integration of such constraints appears challenging, their use provides the opportunity to considerably restrict the degrees of freedom of any natural human parameterization towards plausible solutions.

Herein, we address the monocular inference problem for multiple interacting people, by providing a model for 2d and 3d pose and shape reconstruction over time. Our contributions include (i) a semantic feedforward-feedback module that combines 2d human joint detection, semantic segmentation, and 3d pose prediction of people, with pose and shape refinement based on a novel semantic cost that aligns the model body parts with their corresponding semantic images regions, producing solutions that explain the complete person layout while taking into account its estimation uncertainty, (ii) incorporation of scene consistency measures including automatic estimation and integration of ground plane constraints, as well as adaptively avoiding simultaneous volume occupancy by several people, and (iii) resolution of the temporal person assignment problem based on body shape, appearance and motion cues within a Hungarian matching method, then solving a joint multiple-person smoothing problem under both 2d projection and 3d pose temporal fluidity constraints. Our quantitative results on datasets like Panoptic (see H. Joo, H. Liu, L. Tan, L. Gui, B. Nabbe, I. Matthews, T Kanade, S. Nobuhara, and Y. Sheikh: "Panoptic studio: A massively multiview system for social motion capture", in ICCV. 2015; wherein the disclosure of said document is incorporated herein by reference) and Human3.6M (see C. Ionescu, D. Papava, V. Olaru, and C. Sminchisescu: "Human3.6M: Large scale datasets and predictive methods for 3d human sensing in natural environments", PAMI, 2014: wherein the disclosure of said document is incorporated by reference) validate the importance of the ingredients in the proposed design. Qualitative results in complex monocular images and video show that the model is able to reconstruct multiple interacting people in challenging scenes in a perceptually plausible way. The model also supports the realistic synthesis of human clothing and appearance (human appearance transfer) as shown in our companion paper (see M. Zanfir, A. Popa, and C. Sminchisescu: "Human appearance transfer", in CVPR, 2018: wherein the disclosure of said document is incorporated herein by reference).

Figure 14:
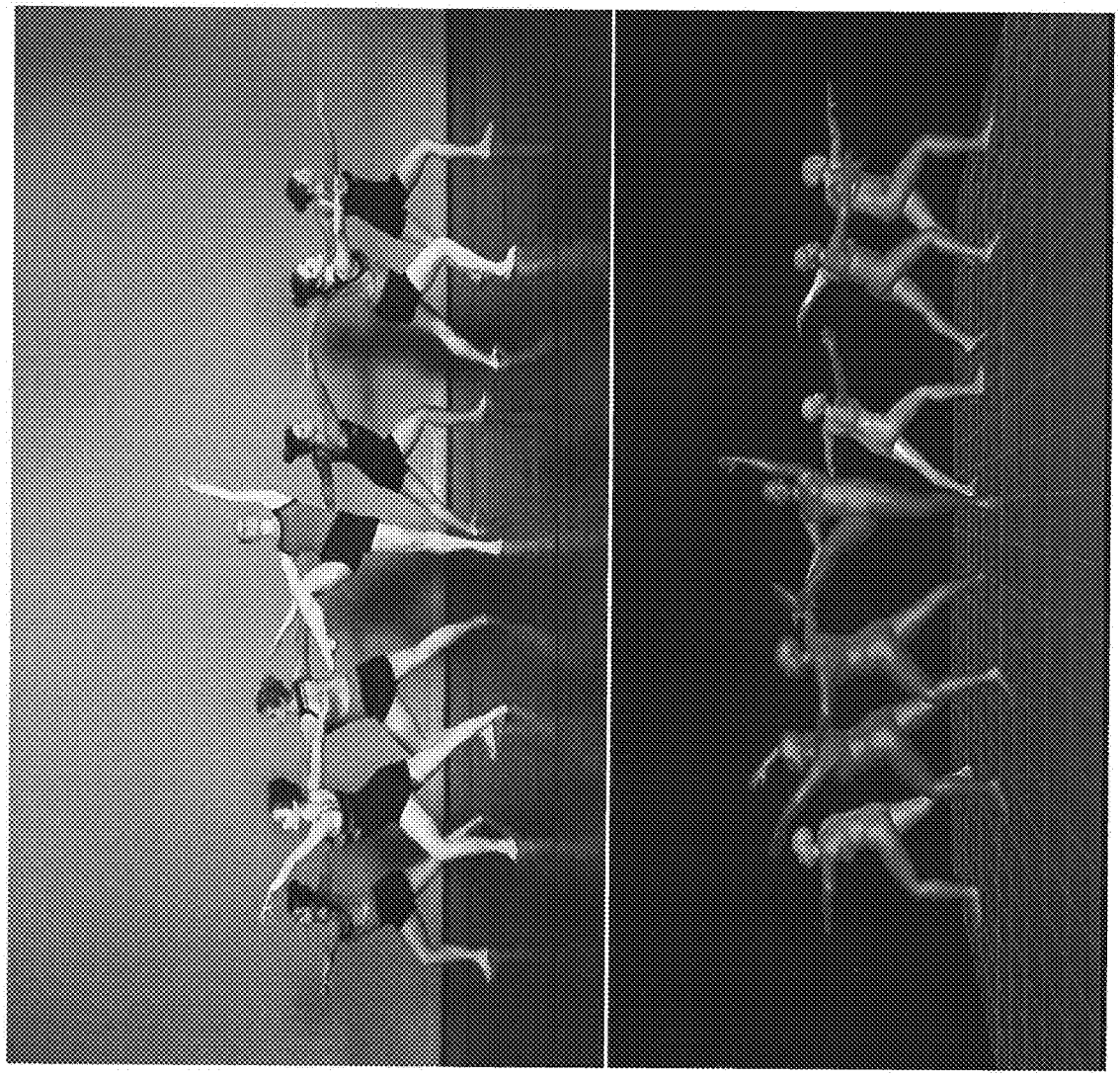
FIG. 14 shows an automatic 3d reconstruction of the pose and shape of multiple people from a monocular image.

FIG. 14 shows an automatic 3d reconstruction of the pose and shape of multiple people from a monocular image, as estimated by our model integrating person and scene constraints. We leverage feedforward and semantic feedback calculations for each person, with joint reasoning on ground plane and volume occupancy over all the people in the scene.

Our work relates to recently developed deep architectures for 2d human pose estimation (see Z. Cao, T. Simon, S. Wei, and Y Sheikh: "Realtime multiperson 2d pose estimation using part affinity fields", in CVPR, 2017; E. Insafutdinov, L. Pishchulin, B. Andres, M. Andriluka, and B. Schiele: "DeeperCut: A deeper, stronger, and faster multiperson pose estimation model", in ECCV, 2016; G. Papandreou. T. Zhu, N. Kanazawa, A. Toshev. J. Tompson, C. Bregler, and K. Murphy: "Towards accurate multi-person pose estimation in the wild", in CVPR, 2017: J. J. Tompson, A. Jain, Y. LeCun, and C. Bregler: "Joint training of a convolutional network and a graphical model for human pose estimation", in NIPS, 2014; A. Toshev and C. Szegedy. Deeppose: "Human pose estimation via deep neural networks", in CVPR, 2014; wherein the disclosures of said documents are incorporated herein by reference), 3d human pose estimation based on fitting volumetric models (see F. Bogo, A Kanazawa, C. Lassner, P. Gehler, J. Romero, and M. J. Black: "Keep it SMPL: Automatic estimation of 3d human pose and shape from a single image", in ECCV. 2016; M. Loper, N. Mahmood. J. Romero, G. Pons-Moll, and M. J. Black: "SMPL: A skinned multi-person linear model", SIGGRAPH, 34(6):248:1-16, 2015; wherein the disclosures of said references are included herein by reference), feedforward deep models for 3d prediction (see J. Martinez, R. Hossain, J. Romero, and J. J. Little: "A simple yet effective baseline for 3d human pose estimation", in ICCV, 2017; G. Pavlakos, X. Zhou, K. G. Derpanis, and K. Daniilidis: "Coarse-to-fine volumetric prediction for single-image 3d human pose", in CVPR, 2017; X. Zhou, M. Zhu, K. Derpanis, and K Daniilidis: "Sparseness meets deepness: 3d human pose estimation from monocular video", in CVPR, 2016; wherein the disclosures of said references are included herein by reference), as well as integrated deep models for 2d and 3d reasoning (see A. Popa, M. Zanfir, and C. Sminchisescu: "Deep multitask architecture for integrated 2d and 3d human sensing", in CVPR, 2017: G. Rogez and C. Schmid: "Mocap-guided data augmentation for 3d pose estimation in the wild", in NIPS. 2016; B. Tekin, P Marquez Neila, M. Salzmann, and P Fua: "Learning to fuse 2d and 3d image cues for monocular body pose estimation", in ICCV, 2017; D. Mehta, S. Sridhar, O. Sotnychenko, H. Rhodin, M. Shafiei, H.-P. Seidel, W. Xu, D. Casas, and C. Theobalt: "Vnect: Realtime 3d human pose estimation with a single rgb camera", ACM Transactions on Graphics (TOG), 36(4): 44, 2017; wherein the disclosures of said documents are incorporated herein by reference). Accurate shape and motion-capture systems, based on multiple cameras or simplified backgrounds, have also been proposed with impressive reconstruction results (see A. Boukhayma, J.-S. Franco, and E. Boyer: "Surface motion capture transfer with Gaussian process regression", in CVPR, 2017; D. A Forsyth. O. Arikan, L. Ikemoto, J. O'Brien, and D. Ramanan: "Computational Studies of Human Motion: Tracking and Motion Synthesis", NOW Publishers Inc, 2006; V. Leroy, J.-S. Franco, and E. Boyer: "Multi-view dynamic shape refinement using local temporal integration", in ICCV, 2017; H. Rhodin, N. Robertini, D. Casas, C. Richardt, H.-P. Seidel, and C. Theobalt: "General automatic human shape and motion capture using volumetric contour cues", in ECCV, 2016; wherein the disclosures of said documents are incorporated herein by reference). Systems designed for the 3d reconstruction of multiple people are relatively rare and existing ones are based on multiple cameras (see V. Belagiannis, S. Amin, M. Andriluka, B. Schiele, N. Navab, and S. Ilic: "3d pictorial structures for multiple human pose estimation", in CVPR, 2014; A. Elhayek. E. de Aguiar, A. Jain, J. Thompson, L. Pishchulin, M. Andriluka, C. Bregler, B. Schiele, and C. Theobalt: "Marconi—convnet-based marker-less motion capture in outdoor and indoor scenes", IEEE transactions on pattern analysis and machine intelligence. 39(3):501-514, 2017: A. Elhayek, E. Aguiar, A. Jain, J. Tompson, L. Pishchulin, M. Andriluka, C. Bregler, B. Schiele, and C. Theobalt: "Efficient ConvNet-based markerless motion capture in general scenes with a low number of cameras", in CVPR. 2015; H. Joo, H. Liu, L. Tan, L. Gui. B. Nabbe, I. Matthews, T. Kanade. S. Nobuhara. and Y Sheikh: "Panoptic studio: A massively multiview system for social motion capture", in ICCV. 2015; Y. Liu, J. Gall, C. Stoll, Q. Dai, H.-P Seidel, and C. Theobalt: "Markerless motion capture of multiple characters using Multiview image segmentation", IEEE transactions on pattern analysis and machine intelligence, 35(11):2720-2735, 2013; wherein the disclosures of said documents are incorporated herein by reference). In A. Elhayek, E. de Aguiar, A. Jain, J. Thompson, L. Pishchulin, M. Andriluka. C. Bregler, B. Schiele, and C. Theobalt: "Marconi-convnet-based marker-less motion capture in outdoor and indoor scenes", IEEE transactions on pattern analysis and machine intelligence, 39(3):501-514, 2017 (wherein the disclosure of said document is incorporated herein by reference), the method uses an arguably low number of cameras (3-4) to reconstruct several people, with promising results, but the level of interaction is somewhat limited. The work of H. Joo, H. Liu, L. Tan, L. Gui, B. Nabbe, I. Matthews, T. Kanade, S. Nobuhara, and Y. Sheikh: "Panoptic studio: A massively multiview system for social motion capture", in ICCV, 2015 (wherein the disclosure of said document is incorporated herein by reference) proposes a multi-person tracking system (which we also use for our 'ground-truth' monocular evaluation), although the system relies on a massive number of RGB and RGB-D cameras for inference, and the capture dome offers inherently limited background variability Our single person initialization relies on the Deep Multitask Human Sensing Network (DMHS) (see A. Popa, M. Zanfir, and C. Sminchisescu: "Deep multitask architecture for integrated 2d and 3d human sensing", in CVPR, 2017; wherein the disclosure of said reference is incorporated herein by reference) for initial 2d and 3d pose inference (body joints, semantic segmentation, pose prediction), which is then refined based on our own implementation of the human body model SMPL (see M. Loper. N. Mahmood, J. Romero, G. Pons-Moll, and M. J. Black: "SMPL: A skinned multi-person linear model", SIGGRAPH, 34(6):248:1-16, 2015; wherein the disclosure of said document is incorporated herein by reference), augmented with learned semantic vertex labeling information, and using a new semantic loss function, which represents one of our contributions. Systems based on discriminative-generative (feedforward-feedback) components for 3d human pose estimation date, in principle, back at least to D. Ramanan and C. Sminchisescu: "Training deformable models for localization", in CVPR. 2006: L. Sigal, A. Balan, and M. J. Black: "Combined discriminative and generative articulated pose and non-rigid shape estimation", in NIPS, 2007; C. Sminchisescu, A. Kanaujia, and D. Metaxas: "Learning joint top-down and bottom-up processes for 3d visual inference", in CVPR, 2006 (wherein the disclosures of said documents are incorporated herein by reference) but our approach leverages considerably different image representations, body models, cost functions and optimization techniques. Our automatic ground plane and adaptive people volume occupancy exclusion constraints, as well as our multiple people assignment and smoothing costs are integrated in a novel and coherent way, although monocular single person costs based on simpler model formulations and/or multiple hypotheses tracking techniques exist in the literature (see F. Bogo, A. Kanazawa, C. Lassner. P. Gehler, J. Romero, and M. J. Black: "Keep it SMPL: Automatic estimation of 3d human pose and shape from a single image", in ECCV, 2016; R. M. Neal, M. J. Beal. and S. T. Roweis: "Inferring state sequences for non-linear systems with embedded hidden Markov models", in NIPS, 2004; V. Ramakrishna, T Kanade. and Y. Sheikh: "Reconstructing 3d human pose from 2d image landmarks", ECCV, 2012; E. Simo-Serra, A. Quattoni, C. Torras, and F. Moreno-Noguer: "A joint model for 2d and 3d pose estimation from a single image", in CVPR, 2013; C. Sminchisescu and A. Jepson: "Variational mixture smoothing for non-linear dynamical systems", in CVPR, 2004; H. Yasin, U. Iqbal, B. Kruger, A. Weber, and J. Gall: "A dualsource approach for 3d pose estimation from a single image", in CVPR, 2016; wherein the disclosures of said documents are incorporated herein by reference).

Multiple Persons in the Scene Model

Problem formulation. Without loss of generality, we consider $N_p$ uniquely detected person in a video with $N_f$ frames. Our objective is to infer the best pose state variables $\Theta=[\theta_p^f]\in\mathbb{R}^{N_p\times N_f\times 72}$, shape parameters $B=[\beta_p^f]\in\mathbb{R}^{N_p\times N_f\times 10}$ and individual person translations $T=[t_p^f]\in\mathbb{R}^{N_p\times N_f\times 3}$, with $P \in N_p$ and $f \in N_f$. We start by first writing a per-frame, person-centric objective function $L_I^{p,f}(B, \Theta, T)$ $$L_I^{p,f} = L_S^{p,f} + L_G^{p,f} + L_R^{p,f} + \sum_{\substack{p'=1 \\ p' \neq p}}^{N_p} L_C^f(p, p'), \quad (1)$$

where the cost $L_S$ takes into account the visual evidence computed in every frame in the form of semantic body part labeling, $L_C$ penalizes simultaneous (3d) volume occupancy between different people in the scene, and $L_G$ incorporates the constraint that some of the people in the scene may have a common supporting plane. The term $L_R^{p,f} = L_R^{p,f}(\theta)$ is a Gaussian mixture prior similar to F. Bogo, A. Kanazawa, C. Lassner, P Gehler, J. Romero, and M. J. Black: "Keep it SMPL: Automatic estimation of 3d human pose and shape from a single image", in ECCV, 2016 (wherein the disclosure of said document is incorporated herein by reference). The image cost for multiple people under all constraints can be written as $$L_I^f = \sum_{p=1}^{N_p} L_I^{p,f} \quad (2)$$

If a monocular video is available, the static cost $L_f$ is augmented with a trajectory model applicable to each person once the temporal assignment throughout the entire video has been resolved. The complete video loss writes $$\mathcal{L} = \mathcal{L}_I + \mathcal{L}_T = \sum_{p=1}^{N_p} \sum_{f=1}^{N_f} \left( L_I^{p,f} + L_T^{p,f} \right) \quad (3)$$

where $L_T$ can incorporate prior knowledge on human motion, ranging from smoothness, assumptions of constant velocity or acceleration, or more sophisticated models learned from human motion capture data. In the next sections, we describe each cost function in detail. Whenever unambiguous, we drop the f and p super-scripts.

In order to infer the pose and 3d position of multiple people we rely on a parametric human representation, SMPL (see M. Loper, N. Mahmood, J. Romero, G. Pons-Moll, and M. J. Black: "SMPL: A skinned multi-person linear model", SIGGRAPH, 34(6):248:1-16, 2015: wherein the disclosure of said document is incorporated herein by reference), with a state-of-the-art deep multitask neural network for human sensing, DMHS (see A. Popa, M. Zanfir, and C. Sminchisescu: "Deep multitask architecture for integrated 2d and 3d human sensing", in CVPR, 2017; wherein the disclosure of said document is incorporated herein by reference). In practice, we cannot assume a constant number of people throughout a video and we first infer the parameters B, Θ, T independently for each frame by minimizing the sum of the first two cost functions: $L_S$ and $L_C$. Then, we temporally track the persons obtained in each frame by means of optimally solving an assignment problem, then re-optimize the objective, by adding the temporal and ground plane constraints, $L_T$ and LG. For those people detected in only some of the frames, optimization will proceed accordingly over the corresponding subset. An overview of the method is shown in FIG. 15.

Figure 15:
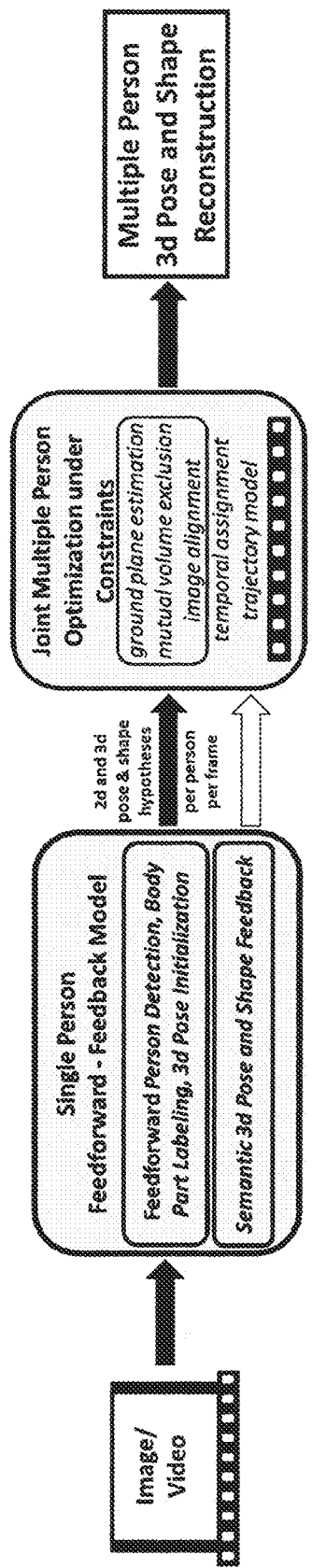
FIG. 15 shows a processes/modules of estimating 3d pose and body shape of multiple people according to an embodiment.

FIG. 15 shows a processing pipeline of our monocular model for the estimation of 3d pose and body shape of multiple people. The system combines a single person model that incorporates feedforward initialization and semantic feedback, with additional constraints such as ground plane estimation, mutual volume exclusion, and joint inference for all people in the scene. For monocular video, the 3d temporal assignment of people is resolved using a Hungarian method, and trajectory optimization is performed jointly over all people and timesteps, under all constraints, including image consistency, for optimal results.

Single Person Feedforward Feedback Model

SMPL (see M. Loper, N. Mahmood, J. Romero, G. Pons-Moll, and M. J. Black: "SMPL: A skinned multi-person linear model", SIGGRAPH, 34(6):248:1-16, 2015; wherein the disclosure of said document is incorporated herein by reference) is a differentiable parametric human model—represented by template vertices $V_0$—and controlled by pose vectors $\theta \in \mathbb{R}^{1 \times 72}$ and shape parameters $\beta \in \mathbb{R}^{1 \times 10}$. The pose of the model is defined by a standard skeletal rig that has the main body joints. For each body part, the vectors controlling the pose are provided in axis-angle representations of the relative rotations w.r.t. their parents in the kinematic tree. The axis angle for every joint is transformed to a rotation matrix using the Rodrigues transformation. The shape parameters $\beta$ impact limb size, height and weight and represent coefficients of a low dimensional shape space learned from registered meshes. SMPL provides matrix functions dependent on $\theta$ and $\beta$, namely, $V(\theta, \beta | V_0) \in \mathbb{R}^{n_V \times 3}$ which gives the transformed vertex positions for the whole mesh, and $J(\theta, \beta | V_0) \in \mathbb{R}^{n_J \times 3}$, which outputs the joint positions for the associated kinematic tree. The total number of vertices in the SMPL model is $n_V = 6890$ and the total number of joints in the kinematic tree is $n_J = 24$. For simplicity of explanation, let v denote $V(\theta, \beta | V_0)$ and let x be $J(\theta, \beta | V_0)$. We refer to the translation of the model in camera space as $t \in \mathbb{R}^{1 \times 3}$.

DMHS (see A. Popa, M. Zanfir, and C. Sminchisescu: "Deep multitask architecture for integrated 2d and 3d human sensing", in CVPR, 2017; wherein the disclosure of said document is incorporated herein by reference) is a state-of-the-art feedforward multi-task deep neural network for human sensing that provides, for a given image $I \in \mathbb{R}^{W \times H \times 3}$, the following estimates: the 2d and 3d joints of a single person as well as the semantic body parts at pixel level. We denote these 3 outputs by the matrices $y^{3D} \in \mathbb{R}^{m_J \times 3}$, $y^{2D} \in \mathbb{R}^{m_J \times 2}$ and $y^s \in \mathbb{R}^{N_s \times W \times H}$ respectively. We denote by $m_J = 17$ the number of joints in the representation considered by the network and $N_s = 25$ the number of semantic body parts. The method has been shown to perform well for both indoor images as well as outdoor. The challenges of integrating DMHS and SMPL stem from accurately fitting (transferring) the parametric SMPL model to the 3d joint positions predicted by DMHS, as well as designing semantic-based cost functions that allow to efficiently couple the model to the observations —perform 3d fitting in order to best explain the human layout in the image. In order to semantically assign model mesh components to corresponding image regions, one needs a consistent 'coloring' of their vertices according to the NS human body part labels available e.g. in Human3.6M (see C. Ionescu, D. Papava. V. Olaru. and C. Sminchisescu: "Human3.6M: Large scale datasets and predictive methods for 3d human sensing in natural environments", PAMI, 2014: wherein the disclosure of said document is included herein by reference). This can be achieved robustly, during a training process. We project and fit the SMPL model in multiple (4) views and for different ground truth poses from Human3.6M (we chose 100 different poses). Then each model vertex was associated the median image body part label, available in Human3.6M, transferred from images to the corresponding vertex projections. See FIG. 17 for coloring examples.

Figure 17:
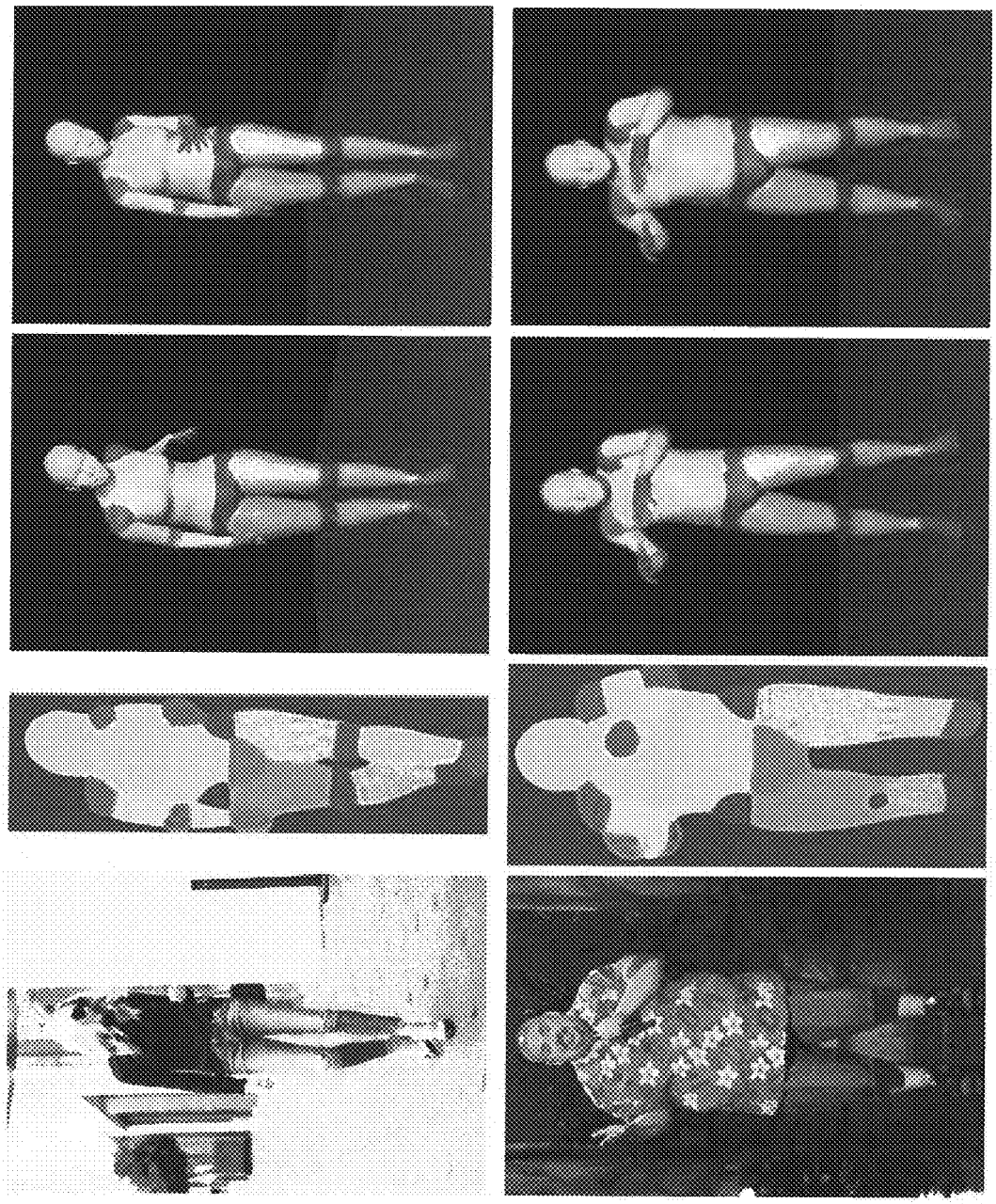
FIG. 17 visualizes importance of semantic feedback in capturing the correct 3d pose and body shape.

FIG. 17 shows importance of semantic feedback in capturing the correct 3d pose and body shape. From left to right: input image, semantic body labeling produced by DMHS, inferred body shape and pose without the semantic term ($\Phi_J$ only) and the semantically fitted model $\Phi_S$.

Single Person Feedforward Feedback Model: Feedforward Prediction, Pose & Shape Transfer We detail the transfer procedure for a single person and perform the same steps for all people in each frame of a video. To transfer the feedforward prediction of the configuration of joints $y^{3D}$ obtained from DMHS to the SMPL model, we have to define a cost function $\Phi_{3d}(\theta,\beta)$, and infer optimal $\theta$ and $\beta$ parameters. One such cost function is the Euclidean distance between joints shared in both representations (i.e. $i,j \in C_J$, where $1 \le i \le m_J$ and $C_J$ is the set of compatible joint indices)

$$\Phi_{3d}(\theta, \beta) = \frac{1}{|C_J|} \sum_{i,j \in C_J} \|y^{3D}(i) - (x(j) - x(h))\| \quad (4)$$

where h indicates the index of the pelvis and x(j)-x(h) represents the centered 3d pose configuration with respect to the pelvis joint. Unless otherwise stated, we use $\|\cdot\|$ for the $l_2$ norm, $\|\cdot\|_2$.

However, based on (4) the DMHS to SMPL transfer is unsatisfactory. This is because 1) the prediction made by DMHS is not necessarily a valid human shape, and 2) a configuration in the parameter space of $\beta$ or even in the space of $\theta$ does not necessarily represent an anatomically correct human pose. In F. Bogo, A. Kanazawa, C. Lassner, P. Gehler, J. Romero, and M. J. Black: "Keep it SMPL: Automatic estimation of 3d human pose and shape from a single image", in ECCV, 2016 (wherein the disclosure of said document in included herein by reference), multiple regularizers were added: a norm penalty on P and a prior distribution on $\theta$. However, these risk excessive bias.

We propose an alternative transfer equation, focusing on qualitatively modeling the pose predicted by DMHS so to preserve the 3d orientation of limbs. Our function $\Phi_{cos}$ penalizes the cosine distance between limbs—or selected pairs of joints—that are shared in both representations (property denoted by (i,j), (a,b)$\in C_L$, wherein $1 \le i,j \le m_J$ and $1 \le k, l \le n_J$. Given $a_{ij}=y^{3D}(i)-y^{3D}(j)$ and $b_{kl}=x(k)-x(l)$, the cost is $$\Phi_{cos}(\theta, \beta) = \frac{1}{|C_L|} \sum_{(i,j),(k,l) \in C_L} 1 - \frac{(a_{ij}, b_{kl})}{\|a_{ij}\|\|b_{kl}\|} \quad (5)$$

While in practice the minimization of $\Phi_{cos}$ converges quickly to a perfect solution (often close to 0) and the resulting pose is perceptually similar to DMHS, the implicit shape information provided by DMHS is lost. In situations where the original 3d joint prediction confidence is high (e.g. training and testing distributions are expected to be similar, as in Human3.6M), one can further optimize over P, starting from solutions of (5)

$$\theta^0 = \arg\min_\theta \Phi_{cos}(y^{3D}, \theta, \beta) \quad (6)$$

$$\beta^0 = \arg\min_\beta \Phi_{3d}(y^{3D}, \theta^0, \beta) \quad (7)$$

Figure 16:
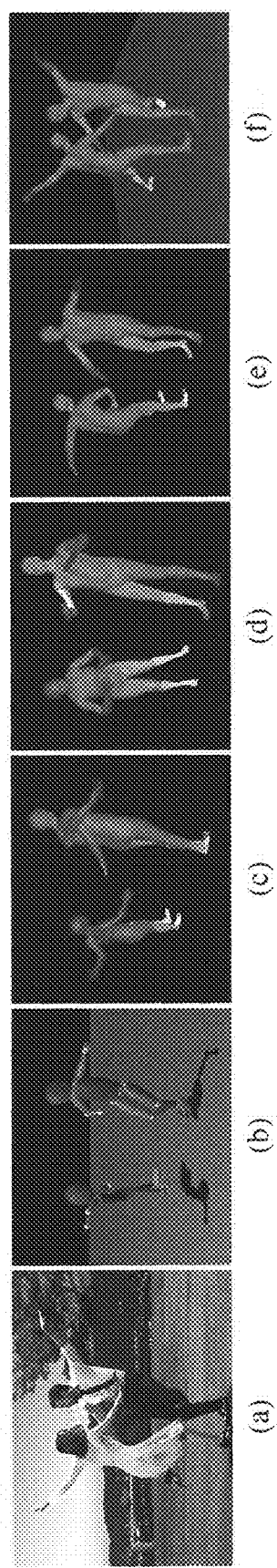
FIG. 16 a 3d shows pose transfer from DMHS to SMPL.

Results of the proposed transfer variants are shown in FIG. 16.

FIG. 16 shows a 3d pose transfer from DMHS to SMPL: (a) input image: (b) 3d joints with links, as estimated by DMHS; (c) transfer after applying (4) directly minimizing Euclidean distances between common 3d joints in both representations. Notice unnatural body shape and weak perceptual resemblance with the DMHS output. (d) is also obtained using (4) but with extra regularization on pose angles—offering plausible configurations but weak fits. (e) transfer results obtained using our proposed cost (5) which preserves limb orientation, and (f) inferred configurations after our semantic optimization, initialized by (e).

Simultaneous Volume Occupancy Exclusion

To ensure that estimated models of people in a scene are not inconsistent, by occupying the same 3d space volume simultaneously, we need additional processing. We design adaptive representations to first compute enclosing parallelepipeds for each person according to its current model estimates, rapidly test for intersections (far-range check), and only integrate detailed, close range collision avoidance into the loss when the far-range response is negative. For close-range volume occupancy exclusion, we use specialized terms obtained as follows: for each person model, we fit tapered superquadrics to each limb, and represent the limb by a series of $N_b$ fitted spheres inside the superquadric, with centers c and radius r. For any two persons, p and p', we define the loss $L_C(p, p')$ based on distances between all spheres belonging, respectively, to the first and second person $$\Phi_C(p, p') = \sum_{i=1}^{N_b} \sum_{j=1}^{N_b} \exp[-\alpha d(c(p, i), c(p', j))] \quad (11)$$

$$d(c, c') = \frac{\|c - c'\|^2}{r^2 + r'^2}. \quad (12)$$

The loss for $N_p$ persons in a frame is defined as the sum over all pair-wise close-range losses $L_C(p, p')$ among people with negative far-range tests. People with positive far-range tests do not contribute to the volume occupancy loss. Notice how this cost potentially couples parameters from all people and requires access to their estimates. See FIG. 18 for visual illustrations.

Figure 18:
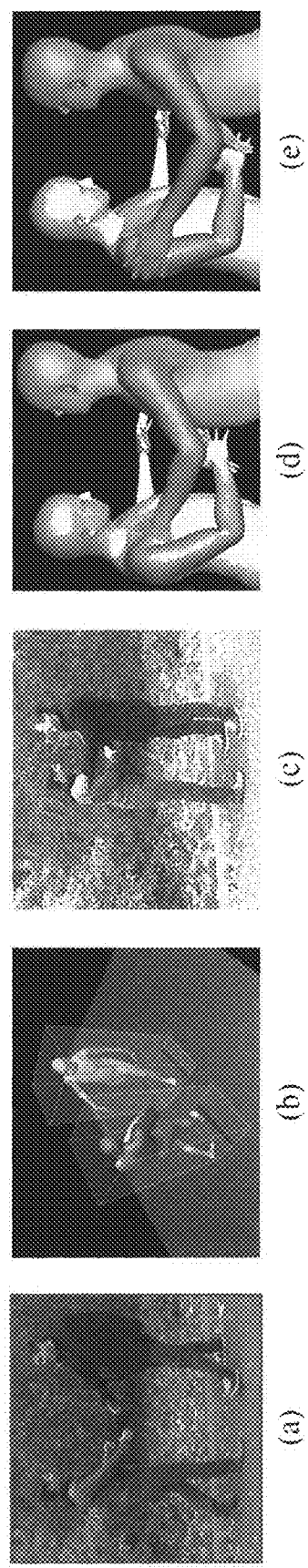
FIG. 18 adaptive volume occupancy avoidance.

FIG. 18 shows adaptive volume occupancy avoidance: (a) input image where people are far apart: (b) visual representation for far-range collision check; (c) image where people are in contact: (d) inferred body shapes without and (e) with collision constraint, which ensures correct contact without simultaneous volume occupancy.

Ground Plane Estimation and Constraint

We include a prior that the scene has a ground-plane on which, on average, the subjects stand and perform actions. To build a correct hypothesis for the location and orientation of the plane, we design a cost that models interactions between the plane and all human subjects, but leaves room for outliers, including people who, temporarily or permanently, are not in contact with the ground. Specifically, we select the 3d ankle positions of all persons in all the frames of a video, be these $v_i$ and fit a plane to their locations.

We assume that a point z is on a plane with a surface normal n if the following equation is satisfied $(z-p)^T n=0$, where p is any fixed point on the plane. Given that some of the ankles might be occluded, we use a confidence term to describe the impact they have on the fitting process. We use the confidence $w_i$ from the DMHS 2d joint detector, with a two-folded purpose to 1) select the initial point p belonging to the plane as the weighted median of all ankle locations of the detected persons, and 2) weight measurements used in the robust L1 norm estimate of the plane hypothesis. Our plane estimation objective is $$n^* = \underset{n}{\operatorname{argmin}} \sum_i w_i \left|(x_i - p)^T \frac{n}{\|n\|}\right|_1 + \alpha |1 - n^T n|_1 \quad (13)$$

The estimates (p, n*) are then used in the ground-plane constraint term LG to penalize configurations with 3d ankle joints estimates away from the plane $$L_G^{p,f} = |(x_l - p)^T n^*|_1 + |(x_r - p)^T n^*|_1 \quad (14)$$

Where the subscripts l and r identify the left and the right ankles for a person p at time f. The weighting of the terms is performed adaptively based on confidences $w_l$, $w_r$, of the associated ankle joints. If these are not visible, or are visible within some distance of the ground and not confident, constraints are applied. If the joints are visible and confident, or far from the ground, constraints are not applied.

Assignment and Trajectory Optimization

Independently performing 3d human body pose and shape optimization in a monocular video can lead to large translation variations along depth directions and movements that lack natural smoothness. For this reason, we propose a temporal constraint that ensures for each of the inferred models that estimates in adjacent frames are smooth. To achieve it, we first need to resolve the assignment problem over time (identify or track the same individual throughout the video), then perform temporal smoothing for each individual track.

To solve the person assignment problem, we use the Hungarian algorithm to optimally build tracks based on an interframe inter-person cost combining the appearance consistency (measured as distances between vectors containing the median colors of the different body parts, computed over the model vertices), the body shape similarity, and the distance between the appropriately translated 3d joints inferred for each person, at frame level.

Once the assignment has been resolved between every pair of estimated person models in every successive set of frames, and tracks are built, several motion priors can be used, ranging from a constant velocity model, to more sophisticated auto-regressive processes or deep recursive predictors learned from training data (see J. Martinez, M. J. Black, and J. Romero: "On human motion prediction using recurrent neural networks", CoRR, abs/1705.02445, 2017; K. Fragkiadaki, S. Levine, P. Felsen, and J. Malik: "Recurrent network models for human dynamics", in ICCV, pages 4346-4354, 2015; J. M. Wang, D. J. Fleet, and A Hertzmann: "Gaussian process dynamical models", in NIPS, 2006; wherein the disclosures of said documents are incorporated herein by reference). The integration of such motion representations in our framework is straightforward as long as they remain differentiable. Here we experiment with constant velocity priors on pose angles, $\Theta$ as well as translation variables. T. Our temporal loss function component at $L_T^f = L_T^{p,f}(\Theta,T)$ frame $f \geq 2$ for a person (track) p is defined as $$L_T^f \|(\Theta^{f+1} - \Theta^f) - (\Theta^f - \Theta^{f-1})\| +$$

$$\|(t^{f+1} - t^f) - (t^f - t^{f-1})\| \quad (15)$$

The shape parameters $\beta_p$ are set as the median of $\beta_p^f$, $\forall f$. Because smoothing axis-angle representations is difficult, the angle-related costs in (15) are represented using quaternions, which are easier to smooth. Gradients are propagated through the axis-angle to quaternion transformation during the optimization.

Experiments

We numerically test our inference method on two datasets, CMU Panoptic (see H. Joo, H. Liu, L. Tan, L. Gui, B. Nabbe, I. Matthews, T Kanade, S. Nobuhara. and Y. Sheikh: "Panoptic studio: A massively multiview system for social motion capture", in ICCV, 2015; wherein the disclosure of said document is incorporated herein by reference) and Human3.6M (see C. Ionescu, D. Papava, V. Olaru, and C. Sminchisescu: "Human3.6M: Large scale datasets and predictive methods for 3d human sensing in natural environments", PAMI, 2014: wherein the disclosure of said document is incorporated herein by reference), as well as qualitatively on challenging natural scenes (see FIG. 20). On Human3.6M we test different components of the model including semantic feedback, smoothing and the effect of multiview constraints. Panoptic in turn provides the real quantitative test-bed for the complete monocular system.

Figure 20:
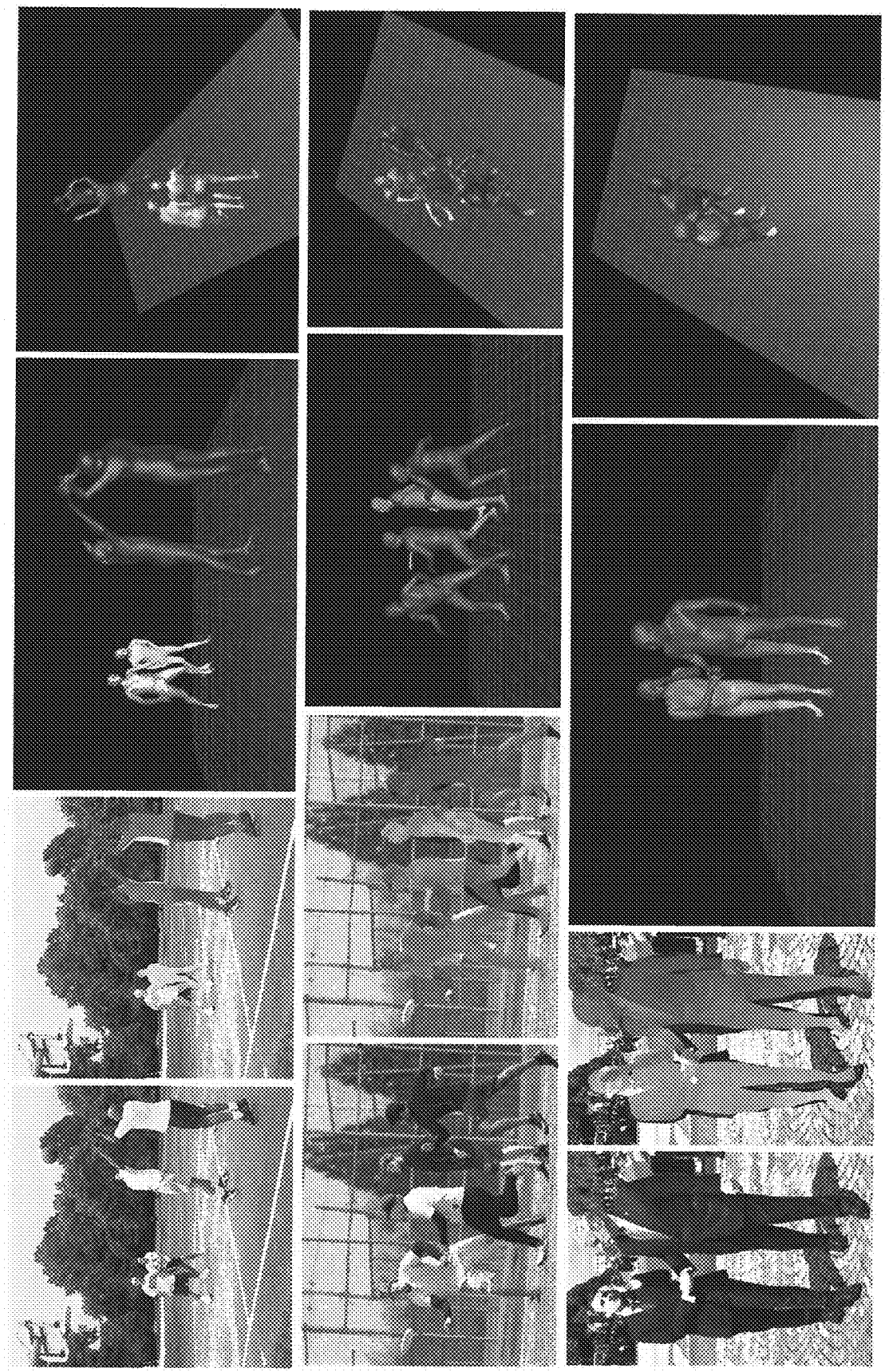
FIG. 20 shows an automatic 3d reconstruction of multiple people from monocular to images of complex natural scenes.

FIG. 20 shows an automatic 3d reconstruction of multiple people from monocular images of complex natural scenes. Left to right: input image, inferred model overlaid, and two different views of 3d reconstructions obtained by our model (including ground plane). Challenging poses, occlusions, different scales and close interactions are correctly resolved in the reconstruction.

Given a video with multiple people, we first detect the persons in each frame and obtain initial feedforward DMHS estimates for their 2d body joints, semantic segmentation and 3d pose. Similarly to E. Marinoiu, M. Zanfir, V. Olaru, and C. Sminchisescu: "3D Human Sensing, Action and Emotion Recognition in Robot Assisted Therapy of Children with Autism", in CVPR, 2018 (wherein the disclosure of said document is incorporated herein by reference), we extend DMHS to partially visible people, by fine-tuning both the semantic and the 3d pose estimation components of DMHS on a partial view version of Human80K (see C. Ionescu, J. Carreira. and C. Sminchisescu: "Iterated secondorder label sensitive pooling for 3d human pose estimation", in Proceedings of the IEEE Conference on Computer Vision and Pattern Recognition, pages 1661-1668, 2014; wherein the disclosure of said document is incorporated herein by reference). For each person we perform the transfer proposed in (5) that aligns the limb directions of 3d estimates predicted by DMSH with the limb directions of SMPL. The transfer gives an initialization for pose and shape. The initial translation of each person is set to 3 meters in front of the camera.

TABLE 1

Automatic 3d human pose and translation estimation errors (in mm) on the Panoptic dataset (9,600 frames, 21,404 people). Notice the value of each component and the impact of the ground-plane constraint on correct translation estimation. Reference 23 behind the DMHS indicates A. Popa, M. Zanfir, and C. Sminchisescu: "Deep multitask architecture for integrated 2d and 3d human sensing", in CVPR, 2017, wherein the disclosure of said document is incorporated herein by reference.

| Method | Haggling | | Mafia | | Ultimatum | | Pizza | | Mean | |
| --- | --- | --- | --- | --- | --- | --- | --- | --- | --- | --- |
| | Pose | Translation | Pose | Translation | Pose | Translation | Pose | Translation | Pose | Translation |
| DMHS | 217.9 | — | 187.3 | — | 193.6 | — | 221.3 | — | 203.4 | — |
| 2D Loss | 135.1 | 282.3 | 174.5 | 502.2 | 143.6 | 357.6 | 177.8 | 419.3 | 157.7 | 390.3 |
| Semantic Loss | 144.3 | 260.5 | 179.0 | 459.8 | 160.7 | 376.6 | 178.6 | 413.6 | 165.6 | 377.6 |
| Smoothing | 141.4 | 260.3 | 173.6 | 454.9 | 155.2 | 368.0 | 173.1 | 403.0 | 160.8 | 371.7 |
| Smoothing Ground Plane | 140.0 | 257.8 | 165.9 | 409.5 | 150.7 | 301.1 | 156.0 | 294.0 | 153.4 | 315.5 |

TABLE 2

Mean per joint 3d position error (in mm) on the Human3.6M dataset, evaluated on the test set of several very challenging actions. Notice the importance of various constraints in improving estimation error. Reference 23 behind the DMHS indicates A. Popa, M. Zanfir, and C. Sminchisescu: "Deep multitask architecture for integrated 2d and 3d human sensing", in CVPR, 2017, wherein the disclosure of said document is incorporated herein by reference.

| Method | WalkingDog | Sitting | Sitting Down |
| --- | --- | --- | --- |
| DMHS | 78 | 119 | 106 |
| Semantic Loss | 75 | 109 | 101 |
| Multi View | 51 | 71 | 65 |
| Smoothing | 48 | 68 | 64 |

Human3.6M is a large-scale dataset that contains single person images recorded in a laboratory setup using a motion capture system. The dataset has been captured using 4 synchronized RGB cameras and contains videos of 11 actors performing different daily activities. We select 3 of the most difficult actions: sitting, sitting down and walking dog to test our single-person model. We use the official left-out test set from the selected actions, consisting of 160K examples. On this dataset we can only evaluate the pose inference under MPJPE error, but without the translation relative to the camera. We show results in table 2. We obtain an improvement over DMHS by using the proposed semantic 3d pose and shape feedback, cf (10). On this dataset, we also experiment with multi-view inference and show a consistent improvement in 3d pose estimation. For multi-view inference, the loss function proposed in (10) is easily extended as a sum over measurements in all available cameras. Adding a temporal smoothness constraint further reduces the error. We also evaluated our method on all 15 actions from the official test set (911,744 configurations) and obtain an average error of 69 mm Detailed results can be seen at http://vision.imar.ro,human3.6m/ranking.php (Testset H36M_NOS 10).

CMU Panoptic Dataset.

We selected data from 4 activities (Haggling, Mafia, Ultimatum and Pizza) which contain multiple people interacting with each other. For each activity we selected 2 sub-sequences, each lasting 20 seconds (i.e. 600 frames), from HD cameras indices 30 and 16 (for variability only, all testing is monocular). In total, we obtain 9,600 frames that contain 21,404 people. We do not validate/train any part of our method on this data.

Evaluation Procedure.

We evaluate both the inferred pose, centered in its hip joint, under mean per joint position error (MPJPE), and the estimated translation for each person under standard Euclidean distance. We perform the evaluation for each frame in a sequence, and average the results across persons and frames. We match each ground-truth person in the scene with an estimation of our model. For every ground truth pose, we select the closest inferred model under the Euclidean distance, in camera space.

Ablation Studies.

Figure 19:
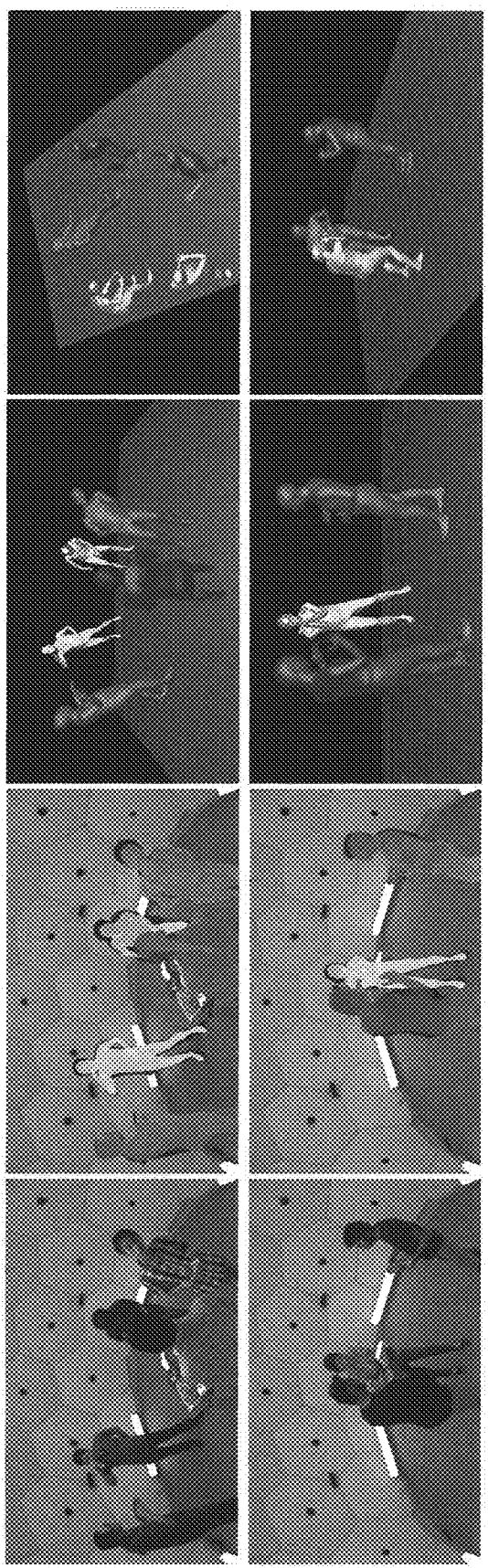
FIG. 19 shows an automatic monocular 3d reconstruction of multiple people in videos.

We systematically test the main components of the proposed monocular inference system and show the results detailed for each activity in table 1. Compared to DMHS, our complete method reduces the MPJPE error significantly, from 203.4 mm to 153.4 mm on average (−25%), while also computing the translation of each person in the scene. The translation error is, on average, 315.5 mm. The semantic projection term helps disambiguate the 3d position of persons and reduces the translation error compared to using only the 2d projection term Temporally smoothing the pose estimates decreases the translation error further. Imposing the ground plane constraint makes the most significant contribution in this setup, decreasing the total translation error from 371 mm to 315 mm (−15%). Even though the total pose error also decreases when all constraints are imposed, on some sequences (e.g. Haggling) the error did not decrease when semantic terms are used. At a closer look, we noticed that the semantic maps and 3d initialization from DMHS were particularly noisy on those sequences of Haggling, camera index 30. Qualitative results in monocular images from the Panoptic dataset are shown in FIG. 19. Our method produces perceptually plausible 3d reconstructions with good image alignment in scenes with many people, some only partially visible, and captured under non-conventional viewing angles.

FIG. 19 shows an automatic monocular 3d reconstruction of multiple people in Panoptic videos. Left to right: input image, inferred model overlaid to assess fitting quality, two different views of the 3d reconstruction. Unusual viewing angles, pose variability, partial views and occlusions, make monocular reconstruction challenging. Quantitative results are given in table 1.

Conclusions

We have presented a monocular model for the integrated 2d and 3d pose and shape estimation of multiple people, under multiple scene constraints. The model relies on feed-forward predictors for initialization and semantic fitting for feedback and precise refinement (shape adaption) to the observed person layout. It estimates and further integrates ground plane and volume occupancy constraints, as well as temporal priors for consistent, plausible estimates, within a single joint optimization problem over the combined representation of multiple people, in space and time. Our experimental evaluation, including ablation studies, is extensive, covers both single-person and multiple-person datasets and illustrates the importance of integrating multiple constraints.

Moreover, we qualitatively show that the method produces 3d reconstructions with tight image alignment and good perceptual quality, in both monocular images and video filmed in complex scenes, with multiple people, severe occlusion and challenging backgrounds. To our knowledge, such a large-scale fully automatic monocular system for multiple person sensing under scene constraints has been presented here for the first time.

It has to be noted that any of the embodiments and features of any of the embodiments, described herein, may be combined with each other, unless a combination is explicitly excluded.

Additionally, also other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

In the following, there are provided further explanations of examples of the present invention headed "Human Appearance Transfer" and "Monocular 3D Pose and Shape Estimation of Multiple People in Natural Scenes—The Importance of Multiple Scene Constraints" which are incorporated in their entirety and are part of the present disclosure.

FURTHER EMBODIMENTS OF THE PRESENT APPLICATION

Figure 23:
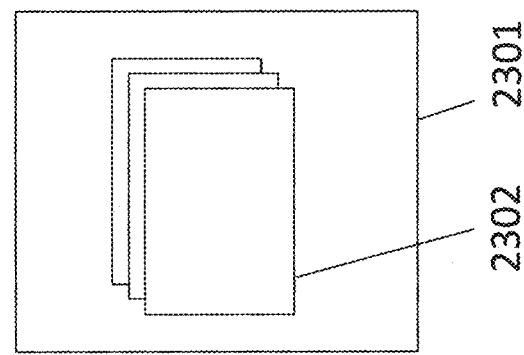
FIG. 23 visualizes a device arranged according an embodiment of the present invention.

FIG. 23 visualizes a device 2301 arranged according an embodiment of the present invention. The device 2301 is arranged to execute at least one of the above-described steps. Particularly, the device 2301 is arranged to execute the steps as defined in any one the claims. According to the embodiment of FIG. 23, the device 2301 comprises one or more processors 2302, i.e., at least one processor 2302, configured to execute at least one of the above-described steps, particularly, the steps as defined in any one of the claims.

Figure 24:
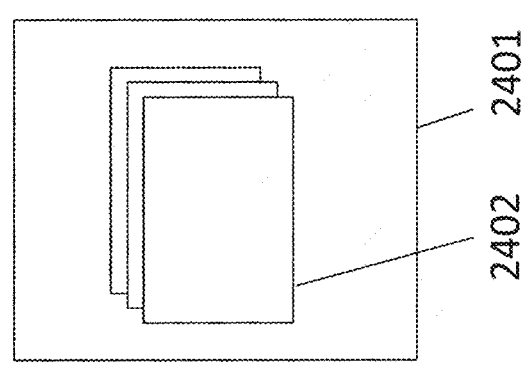
FIG. 24 visualizes a system arranged according an embodiment of the present invention.

FIG. 24 visualizes a system 2401 arranged according an embodiment of the present invention. The system 2401 is arranged to execute at least one of the above-described steps. Particularly, the system 2401 is arranged to execute the steps as defined in any one the claims. According to the embodiment of FIG. 23, the system 2401 comprises one or more processors 2402, i.e., at least one processor 2402, configured to execute at least one of the above-described steps, particularly, the steps as defined in any one of the claims.

Figure 25:
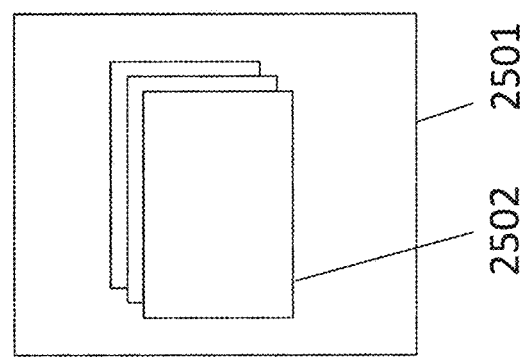
FIG. 25 visualizes a computer program arranged according an embodiment of the present invention.

FIG. 25 visualizes a computer program 2501 arranged according an embodiment of the present invention. The computer program 2501 comprises instructions 2502, which when executed by a processor carry out at least one of the above-described steps. Particularly, the instructions 2502 are arranged to execute the steps as defined in any one the claims. According to an embodiment, one or more processors 2302 of the device 2301 carry out said steps. According to a further embodiment, one or more processors 2402 of the system 2401 are arranged to execute the steps as defined in any one the claims.

Summarizing in view of the aforesaid, the present invention is directed to generating an image based on first image data of a first person having first pose, first body shape, and first clothing and second image data of a second person having second pose, a second body shape, and second clothing. The generated image represents a transfer of appearance (e.g., clothing) of the second person to the first person. This is achieved by modeling 3d human pose and body shape for each of the persons via triangle mesh, fitting the 3d human pose and body shape models to the images of the persons, transferring appearance using barycentric methods for commonly visible vertices, and learning to color the remaining ones using deep image synthesis techniques.

It has to be noted that any of the embodiments and features of any of the embodiments, described herein, may be combined with each other, unless a combination is explicitly excluded.

Additionally, also other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for generating an appearance image based on first image data of a first person having a first pose, a first body shape, and a first clothing and second image data of a second person having a second pose, a second body shape, and a second clothing, wherein the generated appearance image is an image of the first person, wherein:
   the first image data comprises a first image and a first three dimensional (3D) human pose and body shape fitting model, which comprises a first number of vertices and a first set of faces that form a first triangle mesh, which represents estimates of the first pose and of the first shape of the first person in the first image; and
   the second image data comprises a second image and a second 3D human pose and body shape fitting model, which comprises a second number of vertices and a second set of faces that form a second triangle mesh, which represents estimates of the second pose and of the second shape of the second person in the second image; and
   wherein the method is performed by an image processing computer and comprises:
   determining a common set of visible vertices comprising vertices that are visible in the first triangle mesh with regard to the first person and in the second triangle mesh with regard to the second person, wherein a visible vertice is a vertice that is visible in the first image and in the second image;
   determining a divergent set of vertices visible in the first triangle mesh with regard to the first person and not visible in the second image;
   assigning colors to the vertices in the common set of visible vertices by using a transfer of image color information, based on a projection of the vertices in the common set of visible vertices into the second image, and based on barycentric triangle coordinates;
   completing assignment of body color in the first triangle mesh by using a first neural network module trained for body color completion by assigning colors to vertices of the divergent set of vertices;
generating an image comprising the first person as represented by the colored first triangle mesh from the completing assignment step; and
producing a final appearance image of the first person by completing appearance of the first person in the generated image by using a second neural network module trained for human appearance synthesis by assigning colors of the first person to the generated image, that are part of the second clothing, but cannot be modeled by the first triangle mesh model of the first person and the first neural network module for the body color completion.

2. The method according to claim 1, further comprising:
training the first neural network module for the body color completion, the training comprising using weakly-supervised learning based on sampling subsets of visible vertices of a 3D mesh fitted to images of people, as source and target set for self-training, respectively; and
training a second neural network module for the human appearance synthesis, the training comprising assigning colors of each resulting appearance image of each person of the people that cannot be modeled by a first mesh model of the each person and the first neural network for body color completion for the each person, wherein the second neural network module for the human appearance synthesis is trained to predict its final output, given among inputs, clothing segmentation layout, disparity map and results predicted by the first neural network for body color completion.

3. The method according to claim 1, further comprising:
determining, in a first image, the first person and the first image data of the first person; and
determining, in a second image, the second person and the second image data of the second person.

4. The method according to claim 1, wherein:
the assigned colors of resulting appearance image of the first person, which are part of the second clothing, are outside coverage of the first triangle mesh model of the first person;
the first person is different from the second person; or
the first person and the second person are the same person.

5. The method according to claim 1, wherein the first 3D human pose and body shape fitting model represents a tuple $St=(Ct, Dt, Mt)$, wherein, with regard to the first triangle mesh, Ct encodes a RGB color at each vertex position, Dt encodes a disparity 3d depth map of the first triangle mesh with respect to the first image data of the first person, and Mt encodes a visibility of each vertex, and wherein the second 3D human pose and body shape fitting model represents a tuple $Ss=(Cs, Ds, Ms)$, wherein, with regard to the second triangle mesh, Cs encodes a RGB color at each vertex position, Ds encodes a disparity map of the second triangle mesh with respect to the second image data of the second person, and Ms encodes a visibility of each vertex.

6. The method according to claim 1, wherein the first 3D human pose and body shape fitting model is obtained by determining, with regard to the first person in the first image and by using a multitask deep neural network model, corresponding 2D body joint locations, semantic body part segments and 3D pose of the first person in the first image, wherein the first 3D human pose and body shape fitting model is refined by executing non-linear optimization, and wherein the second 3D human pose and body shape fitting model is obtained by determining, with regard to the second person in the second image and by using the multitask deep neural network model, corresponding 2D body joint locations, semantic body part segments and 3D pose of the second person in the second image, wherein the second 3D human pose and body shape fitting model is refined by executing non-linear optimization.

7. The method according to claim 6, wherein the refining the first 3D human pose and body shape fitting model by executing non-linear optimization comprises aligning, with regard to the first person, a corresponding articulated human body mesh with a semantic segmentation layout obtained by using the multitask deep neural network model with regard to the first person, and wherein the refining the second 3D human pose and body shape fitting model by executing non-linear optimization comprises aligning, with regard to the second person, a corresponding articulated human body mesh with a semantic segmentation layout obtained by using the multitask deep neural network model with regard to the second person.

8. The method according to claim 6, wherein the non-linear optimization is performed by executing semantic fitting where vertices of a respective mesh model carry a body type which is matched to the corresponding body type pixels detected in the respective image data such that vertices of a particular type of 3D model correspond to pixels detected of the same type in the image.

9. The method according to claim 1, wherein the first and the second neural network modules are trained in an end-to-end learning process and using a multi-task loss function.

10. The method according to claim 1, wherein the generating of the image comprises transferring a clothing layout of the second image data to a clothing layout of the first image data.

11. An image processing system for generating an appearance image based on first image data of a first person having a first pose, a first body shape, and a first clothing and second image data of a second person having a second pose, a second body shape, and a second clothing, wherein the generated appearance image is an image of the first person, wherein:
the first image data comprises a first image and a first three dimensional (3D) human pose and body shape fitting model, which comprises a first number of vertices and a first set of faces that form a first triangle mesh, which represents estimates of the first pose and of the first shape of the first person in the first image; and
the second image data comprises a second image and a second 3D human pose and body shape fitting model, which comprises a second number of vertices and a second set of faces that form a second triangle mesh, which represents estimates of the second pose and of the second shape of the second person in the second image; and
wherein the image processing system comprises:
a processor;
a non-transitory computer readable medium; and
stored instructions translatable by the processor to perform:
determining a common set of visible vertices comprising vertices that are visible in the first triangle mesh with regard to the first person and in the second triangle mesh with regard to the second person, wherein a visible vertice is a vertice that is visible in the first image and in the second image;
determining a divergent set of vertices visible in the first triangle mesh with regard to the first person and not visible in the second image;

assigning colors to the vertices in the common set of visible vertices by using a transfer of image color information, based on a projection of the vertices in the common set of visible vertices into the second image, and based on barycentric triangle coordinates;

completing assignment of body color in the first triangle mesh by using a first neural network module trained for body color completion by assigning colors to vertices of divergent set of vertices;

generating an image comprising the first person as represented by the colored first triangle mesh from the completing assignment step; and producing a final appearance image of the first person by completing appearance of the first person in the generated image by using a second neural network module trained for human appearance synthesis by assigning colors of the first person to the generated image, that are part of the second clothing, but cannot be modeled by the first triangle mesh model of the first person and the first neural network module for the body color completion.

12. The image processing system of claim 11, wherein the stored instructions are further translatable by the processor to perform:

training the first neural network module for the body color completion, the training comprising using weakly-supervised learning based on sampling subsets of visible vertices of a 3D mesh fitted to images of people, as source and target set for self-training, respectively; and training a second neural network module for the human appearance synthesis, the training comprising assigning colors of each resulting appearance image of each person of the people that cannot be modeled by a first mesh model of the each person and the first neural network for body color completion for the each person, wherein the second neural network module for the human appearance synthesis is trained to predict its final output, given among inputs, clothing segmentation layout, disparity map and results predicted by the first neural network for body color completion.

13. The image processing system of claim 11, wherein the stored instructions are further translatable by the processor to perform:

determining, in a first image, the first person and the first image data of the first person; and determining, in a second image, the second person and the second image data of the second person.

14. The image processing system of claim 11, wherein:

the assigned colors of resulting appearance image of the first person, which are part of the second clothing, are outside coverage of the first triangle mesh model of the first person;

the first person is different from the second person; or the first person and the second person are the same person.

15. The image processing system of claim 11, wherein the first 3D human pose and body shape fitting model represents a tuple St=(Ct, Dt, Mt), wherein, with regard to the first triangle mesh, Ct encodes a RGB color at each vertex position, Dt encodes a disparity 3d depth map of the first triangle mesh with respect to the first image data of the first person, and Mt encodes a visibility of each vertex, and wherein the second 3D human pose and body shape fitting model represents a tuple Ss=(Cs, Ds, Ms), wherein, with regard to the second triangle mesh, Cs encodes a RGB color at each vertex position, Ds encodes a disparity map of the second triangle mesh with respect to the second image data of the second person, and Ms encodes a visibility of each vertex.

16. The image processing system of claim 11, wherein the first 3D human pose and body shape fitting model is obtained by determining, with regard to the first person in the first image and by using a multitask deep neural network model, corresponding 2D body joint locations, semantic body part segments and 3D pose of the first person in the first image, wherein the first 3D human pose and body shape fitting model is refined by executing non-linear optimization, and wherein the second 3D human pose and body shape fitting model is obtained by determining, with regard to the second person in the second image and by using the multitask deep neural network model, corresponding 2D body joint locations, semantic body part segments and 3D pose of the second person in the second image, wherein the second 3D human pose and body shape fitting model is refined by executing non-linear optimization.

17. The image processing system of claim 16, wherein the refining the first 3D human pose and body shape fitting model by executing non-linear optimization comprises aligning, with regard to the first person, a corresponding articulated human body mesh with a semantic segmentation layout obtained by using the multitask deep neural network model with regard to the first person, and wherein the refining the second 3D human pose and body shape fitting model by executing non-linear optimization comprises aligning, with regard to the second person, a corresponding articulated human body mesh with a semantic segmentation layout obtained by using the multitask deep neural network model with regard to the second person.

18. The image processing system of claim 16, wherein the non-linear optimization is performed by executing semantic fitting where vertices of a respective mesh model carry a body type which is matched to the corresponding body type pixels detected in the respective image data such that vertices of a particular type of 3D model correspond to pixels detected of the same type in the image.

19. The image processing system of claim 11, wherein the first and the second neural network modules are trained in an end-to-end learning process and using a multi-task loss function.

20. The image processing system of claim 11, wherein the generating of the image comprises transferring a clothing layout of the second image data to a clothing layout of the first image data.

* * * * *